United States Patent
Gramatica

(10) Patent No.: US 10,025,862 B2
(45) Date of Patent: Jul. 17, 2018

(54) INFORMATION NETWORK WITH LINKED INFORMATION NODES

(71) Applicant: Yewno, Inc., Atherton, CA (US)

(72) Inventor: Ruggero Gramatica, London (GB)

(73) Assignee: Yewno, Inc., Redwood City, CA (US)

( * ) Notice: Subject to any disclaimer, the term of this patent is extended or adjusted under 35 U.S.C. 154(b) by 463 days.

(21) Appl. No.: 14/315,229

(22) Filed: Jun. 25, 2014

(65) Prior Publication Data

US 2014/0337306 A1 Nov. 13, 2014

Related U.S. Application Data

(63) Continuation of application No. PCT/EP2013/050056, filed on Jan. 3, 2013.

(30) Foreign Application Priority Data

Jan. 5, 2012 (GB) .................................. 1200158.2

(51) Int. Cl.
- *G06F 17/30* (2006.01)
- *G06F 7/00* (2006.01)
- *G06F 17/27* (2006.01)

(52) U.S. Cl.
CPC .... *G06F 17/30867* (2013.01); *G06F 17/2785* (2013.01); *G06F 17/30011* (2013.01);
(Continued)

(58) Field of Classification Search
None
See application file for complete search history.

(56) References Cited

U.S. PATENT DOCUMENTS

2006/0053098 A1 3/2006 Gardner et al.
2006/0053172 A1* 3/2006 Gardner .................. G06N 5/02
(Continued)

FOREIGN PATENT DOCUMENTS

| WO | WO 2009/076728 A1 | 6/2009 |
|---|---|---|
| WO | 2013102646 | 7/2013 |

OTHER PUBLICATIONS

Wei, et al. Mining Concept Associations for Knowledge Discovery Through Concept Chain Queries, Advances in knowledge discovery and data mining; lecture notes in computer science; LNCS, vol. 4426, May 22, 2007, pp. 555-562, XP019078766, Sringer-Verlag, Berlin Heidelberg, De ISBN: 978-3-540-71700-3. Section 3, 4.
(Continued)

*Primary Examiner* — Sangwoo Ahn
(74) *Attorney, Agent, or Firm* — Schwegman Lundberg & Woessner, P.A.

(57) ABSTRACT

A machine-implemented method of relaying information nodes in an information network, comprising the steps of: processing a plurality of data objects according to a predefined dictionary containing a plurality of information units and a plurality of correlation-indicating elements to defect in the plurality of data objects the presence of a correlation between respective information units; establishing an information network with a plurality of information nodes and links between the information nodes, said information nodes being related to said information units and said links being related to said detected correlations; and analyzing a link connectivity state of said information network to find a path across information nodes that represent an inference or a set of inferences being input by a query searched by a user.

19 Claims, 12 Drawing Sheets

(52) U.S. Cl.
CPC .... *G06F 17/3053* (2013.01); *G06F 17/30545* (2013.01); *G06F 17/30554* (2013.01); *G06F 17/30595* (2013.01); *G06F 17/30731* (2013.01); *G06F 17/30864* (2013.01); *G06F 17/30958* (2013.01)

(56) References Cited

U.S. PATENT DOCUMENTS

| | | | |
|---|---|---|---|
| 2010/0205200 A1 | 8/2010 | Hsieh et al. | |
| 2013/0246439 A1* | 9/2013 | Liekens | G06F 17/30958 707/748 |
| 2017/0024476 A1 | 1/2017 | Gramatica | |

OTHER PUBLICATIONS

International search report and written opinion dated Feb. 25, 2013 for PCT Application No. EP2013/050056.

Gramatica, et al, "Graph Theory Enables Drug Repurposing—How a Mathematical Model Can Drive the Discovery of Hidden Mechanisms of Action", PLOS ONE, vol. 9, Issue 1, dated Jan. 2014; in 10 pages.

Wei, Jin, "Improving Knowledge Discovery in Document Collections through Combining Text Retrieval and Link Analysis Techniques", Seventh IEEE International Conference on Data Mining,ICDM, IEEE, Piscataway, NJ, US, (Oct. 28, 2007), 193-202.

"International Application Serial No. PCT EP2013 050056, International Preliminary Report on Patentability dated May 15, 2014", 8 pgs.

"International Application Serial No. EP2013 050056, International Search Report dated Feb. 25, 2013", 4 pgs.

"International Application Serial No. EP2013 050056, Written Opinion dated Feb. 25, 2013", 6 pgs.

"U.S. Appl. No. 15/144,259, Examiner Interview Summary dated Mar. 9, 2017", 3 pgs.

"U.S. Appl. No. 15/144,259, Preliminary Amendment filed May 2, 2016", 3 pgs.

"U.S. Appl. No. 15/144,259, Non Final Office Action dated Jan. 25, 2017", 14 pgs.

* cited by examiner

INFORMATION NETWORK WITH LINKED INFORMATION NODES

CROSS-REFERENCE

This application is a continuation of Patent Cooperation Treaty (PCT) patent application number PCT/EP2013/050056, filed Jan. 3, 2013, which claims the benefit of United Kingdom patent application number GB 1200158.2, filed Jan. 5, 2012, each of which is entirely incorporated herein by reference.

TECHNICAL FIELD

The present invention relates generally to a search engine and a machine-based search method for identifying both known and unknown correlations starting from the construction of a knowledge domain. The present invention also relates to a machine-based search method within the field of knowledge management and search engine design. The present invention also relates generally to a machine-based search method within the knowledge management and search engine field for identifying both known and unknown concepts inferences (via a multi-level correlations path) starting from the analysis and extraction of semantic concepts, correlating them across a multitude of Natural Language based sources and finally analysing and processing the resulted knowledge domain in the form of a weighted graph.

BACKGROUND

Publications, journals, scientific data and most of other subject matters as a whole are a highly unorganized, fragmented and unstructured repository of data, whose growth rate is ever increasing, both in terms of number of documents and sheer number of sources. As the data grow beyond centralized supervision and control, it becomes more and more difficult to find specific non-trivial information, or—if the latter is found—if is hard to evaluate its reliability. More specifically no search engine or machine-based algorithmic method is presently available to search for connections between concepts expressed in homogenous or non-homogenous papers, where "non-homogenous" here means "focused on the same phenomena, but studying them from the perspective of different sciences or disciplines"; "non-homogenous" may also mean relating to different fields of technology or different technical fields. The term concept in the context of the present invention may relate to a term, a name, a description, a nomenclature, a denotation, a definition, an item, a pair, a triplet or a chain of words and so forth. In a simplest form such may be a search item that a user inputs into an internet search machine or queries in a public or private database.

Suitable examples are papers (literature) on human physiology written by biochemists or written by physicians. Here, while the former will deal with the concepts proteins, receptors, genes and biochemical processes, the latter will mention concepts like symptoms, clinical tests, diseases and body organs and tissues, drugs. As such, while some concepts may be known to the community of biochemists, other concepts may be only known to physicians.

Another example is directly derived from the multitude of financial or economic information created every day about stock markets, companies' performance, market indexes, rating agencies, economic trend reports etc.; these information show a great deal of direct and indirect relationships and the high dynamics of their natures make very difficult to construct patterns. By means of the presented invention it is possible to build an interlinked cloud of data that constantly shows emerging patterns and, because their dynamics, their trends. It is, however, noted that the present disclosure does not relate to above information as such, but to technical means that are employed for analysing and searching the information.

Another field of application can very well be fit into any of the geo-political or social behavioural analysis where it is important to trace paths connecting behaviours or sentiments (nodes) and identify unexpected relationships. This could apply to social network, sociopolitics, telecommunication "call analysis", contact relationship analysis and other.

Several search solutions for data search and analysis are already used in many fields but their limitation are severe ones: First, in search engines, for example, a machine receives an input consisting of a textual query, whose words are used in an index-based search that returns to the user a ranked list of documents that might contain the required information. Second in a data mining system, a machine processes an input set of data looking for patterns and trends by means of statistical analysis, in order to provide figures that can confirm or refute a hypothesis (e.g. Baesyan approach)

The first approach is widely known, as it is part of the daily experience of billions of Internet users: its main strength is the wide—almost all comprising—applicability to the more heterogeneous requests and the great ease in formulating the question. The second is mainly known by professionals (especially in science/business) where it is vital to detect contexts, opportunities and risk factors among a huge set of "noisy" data: its main strength is the capability to devise clear and focused answer to the "question" it has been asked. Yet both of them fall short of the task to provide a meaningful answer when an elaboration of knowledge is required. In more details:

Search engines cannot generally produce an answer requiring a structured inference, not even when they are declined in the semantic flavour, i.e. they do not perform a knowledge analysis. Rather they try to provide to a human being the "leads" he needs to find the answer by himself: there is no knowledge processing by the machine, and—in the end—a user is forced to skim through the results to gauge if they are really relevant and to read them altogether to find the answer.

Data mining machines show quite the opposite shortcomings, because they do provide answers but only about very specific subjects and only after the question has been duly declined in a suitable format for a computer elaboration. Artificial Intelligence (AI) systems that are sometimes used for data mining, do work on a knowledge base but their knowledge representation is a static one: in fact it is an ontology—a basic definition of rules of the items or the items as such the system will work with—that must be provided to the system as an input. The machines can then improve their procedures, learning to work better with the defined items but not improve their basic knowledge. Under this perspective they are still operating machines. Moreover, being a complex conceptual structure with input links hard-coded by men, the ontology must be manually built and often its size and entangled rules result in a very cumbersome maintenance.

SUMMARY

The present invention has been made to overcome the above significant technical and conceptual limitations, and it is an object of the present invention to build up a knowledge graph, or a mechanism to construct such a knowledge graph, on a given domain and to provide fools for identifying previously unknown correlations—the links connecting nodes in such graph and/or hidden connections between concepts. The mentioned problems and drawbacks are addressed by the subject-matter of the independent claims. Further preferred embodiments are defined in the dependent claims.

In order to achieve the above object a machine-implemented method relates minimum two—or many—information nodes in an information network. This method comprises the steps of: processing a plurality of data objects expressed in natural language according to a predefined dictionary containing a plurality of information units and a plurality of inherently correlation-indicating elements to detect in the plurality of data objects the presence of a correlation between respective information units; establishing an information network with a plurality of information nodes and links between the information nodes, said information nodes being related to said information units and said links being related to said detected correlations and weighted accordingly; analyzing a link connectivity state of said weighted information network to find a path across multiple information nodes and provide inferences across a multitude of nodes, the nodes being input by a query searched by a user. As a result, a connection may be identified between two or many (end points) information nodes via a path of other intermediate information nodes that was previously unknown to the user.

Said analyzing a link connectivity state of the weighted information network can be effected by means of a stochastic algorithm that utilises a probabilistic crawler defined as "random walker" which navigate the whole weighted graph.

The data object according to the present invention may be any type of data element containing information structured as Natural Language. The data object may thus be a text document, an audio file or even picture/video flies (the latter ones may be OCR-processed to extract natural language expressed information). Further sources of such data objects may be RSS-feeds, tickers, databases, data-streams, digital reports, etc., from which individual raw data objects or a plurality of data objects may be derived. The data object may thus be collected from a variety of distributed input sources, such as digitized archives, World Wide Web sites, intranets, local repositories. Also, the gathered data objects may be appropriately pre-configured as available input sources into the search engine.

An information unit according to the present invention may be a concept, i.e. a term, a name, a description, a nomenclature, a denotation, a definition, an item or a pair or triplet or a chain of words of the above and so forth. For example, in biomedical topics such information on it may be represented by a medical term, a biochemical term, a chemical term, a technical term, or a pharmaceutical term. Further, said term may define any of a drug, an active ingredient, an active agent, a medical compound, a biological entity, a chemical compound, a pharmaceutical compound, a therapy, a cure, a cause, an effect, a disease, a symptom, a disease symptom, a diet, a nutrition, a lifestyle feature (such as smoking), a habit, a pathogenesis, a disease cause, a disease pathogenesis, an item associated with a disease, and an item associated with a pathogenesis of a disease.

As a further example, in an economic/finance topic the information unit would be represented by an economic driver such as those shown in a financial statement, or a stock market parameter or a time series of data. Other could be even ad-hoc "statistical similarities nodes" i.e. preconfigured classes of objects that are identified in the ontology dictionary and represented as atomic information, i.e. a certain corporate action willing to acquire another company in a given market situation can be interpreted as an atomic object called "hostile public offer". Or in a macroeconomic analysis identifying 3 consecutive decreasing GDP (an object) in a given country may lead to a creation of another preconfigured object called "recession of that country"). Such terms may then define a specific performance of a market index, a company's stock price, a corporate action and all its attribute, the related causes/effects, forecasted trend, expected results, and all the general statistics associated to these data and specific ones associated to the collection of time series data. Another meaningful output of the present invention is for example the read-out of the centrality measures of concepts and how they influences the dynamic of certain events. Any macroeconomic dynamic can be inferred and tracked and therefore described even when involving geopolitical shifts.

As yet another example, in psycho/sociological subjects the information unit may be represented by a medical term, a geographical term, a historical reference and so on. Said terms may define demographical trends, historical events, habits, moods and attitudes, or what is generally known as sentiment, etc. Think for instance of Social Network or any Internet social application such as network gaming, or in the forthcoming future public activity such as web voting.

As a still further example, in a telecommunication typical industrial application, subjects maybe originating and terminating calls/contacts, type of actions i.e. in network, off network, roaming, voice call, data call, diverted call, call duration, text messages, multimedia messages. Those subjects (nodes) will define call behavioural analysis also in the not so evident representations. Further, a (cross-)correlation-indicating element according to the present invention can be an element for indicating a certain connection amongst such information units.

In addition, a dictionary according to the present invention is defined by providing at least a list of information units—i.e. concepts—and characterized by a set of correlation-indicating elements. The type of dependence between information units and their correlation-indicating elements can be designed on the basis of the specific subject under examination. Many different ways to produce and maintain one such a dictionary may be defined: by a user via a gate, i.e. an interface, such as an Internet website or in a proprietary fashion with resident application. Then, as a result of defining such a dictionary, the processing entity of a search engine may perform the above-described machine-implemented method.

In addition, a semantic analysis of a data object, for example—but not limited to—a text document comprising natural language, may involve the break down of the data information object into separate sub-units, for example constituent sentences of the text document. Then, each sub-unit may undergo a Natural Language Processing (NLP) analysis so that a parse tree is provided.

Once information sources have been semantically analysed, de-structured in atomic entities, and the concepts correlated across them, the resulted information network which according to the present invention is based on nodes and weighted links, which are (intimate) representations of the information units, e.g. as defined in the dictionary, of the given domain of investigation. The links between the respective nodes are representations of connections as defined by the correlation-indicating elements in the dictionary, and are derived by the above semantic analysis of the plurality of data objects.

BRIEF DESCRIPTION OF THE DRAWINGS

Embodiments of the present invention, which are presented for better understanding the inventive concepts but which are not be seen as limiting the invention, will now be described with reference to the Figures in which.

DETAILED DESCRIPTION

Figure 1:
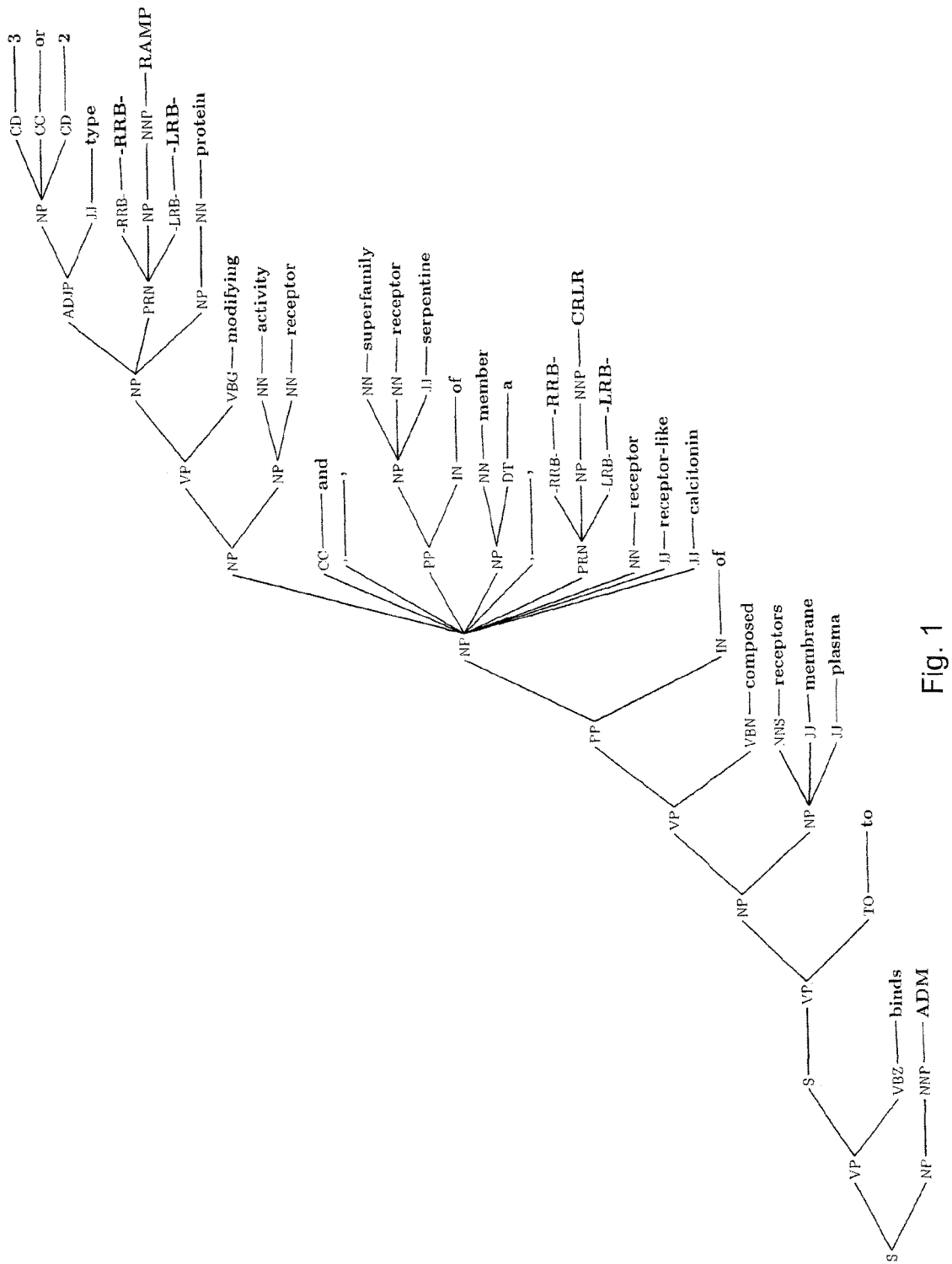
FIG. 1 shows an exemplary schematic representation of a semantic analysis according to an embodiment of the present invention.

The present invention relates generally to a method and an automated system to build and explore the knowledge of any given subject matter expressed in a set of natural language documents or digitized source, with the aim to research and suggest relations among concepts not already known, because such relations are scattered among different sources. The sheer quantity of such information necessitates machine-implemented search and analysis.

The present invention relates generally provides a search method within the field of knowledge management and search engine design for identifying both known and unknown concepts' inferences, involving via a multi-level correlations path and starting from the analysis and extraction of semantic concepts, correlating them across a multitude of natural language based sources and finally analysing and processing the resulted knowledge domain in the form of a weighted graph. By means of the presented invention it is possible to build an interlinked cloud of data that constantly shows emerging patterns and, because their dynamics, their trends. More particularly, it relates to methods for analyzing sets of natural language documents and building a knowledge representation that allows the computerized research of indirect relations among the concepts. i.e., for example, relations that are not present in any single paper/source.

Semantic knowledge-bases have been around since about 1998 however, the present invention looks for concepts and lets the sentences themselves to draw the relations among them. Specifically, verbs are used to characterize the type of interaction (i.e. permitted type of interactions are not imposed, as it is done in current ontologies). Moreover, each relation is given a measure (weight), depending on the syntactic structure of the sentence it is extracted from.

The knowledge representation obtained is formally a graph, but it's meaning is completely different from the one of the ordinary ontologies. We can actually consider more than one kind of relation between concepts; thus, we can describe complex and layered relations and even deal with contradictions. The system proposes a great number of possible—direct and indirect—interconnections (paths) between two concepts, properly ranked according to their total weight. Among those paths the user may find well-known facts, false positives and new unexpected meaningful connections. The latter paths represent a sort of "chain of reasoning" that provides the scientist (user) a lead for further investigations.

An ordinary ontology cannot provide anything other than well-known facts and straightforward inferences. Moreover, in such a system the initiative is upon the user querying the system as he/she needs to ask the right question to get the right answer. There are companies that use a similar approach, however, in the field of bioscience for instance, their product is mainly focused onto placing lab data of performed experiments in the correct context of the performed experiment. This is done by means of a huge, manually curated ontology. Therefore, their suite of applications does not seem to be able to propose any new scientific hypothesis. Their claim about discovering new relations is true when this system is fed with new experimental data; and this can be done only after it has been decided to work on a specific hypothesis. It is a fool for developing a project, not for starting a new one; as explained before their strength is to highlight straightforward inferences. The problem it is addressed in the present invention and the way it is implemented, is not addressed by anyone else.

An aspect of the present invention lies in avoiding the generation of new datasets based on somebody else's primary data, but instead in managing, controlling and aggregating the inferred results and conclusions that these experts in the field have generated based on their individual research and expertise. One may argue that the use of a Natural Language Processing will necessarily miss some interactions which don't conform to NLP algorithms; but the NLP is not the core engine for the build-up of our concepts interactions. NLP in the present model is only the first step of the elaboration and retrieval of information in its atomic structure: its aim is to break down each sentence into its syntactic tree representation (parse tree), which will play the role of the atomic unit of raw information. There is no search of concepts or their interrelation at this NLP stage of elaboration.

However, the adopted NLP engine is proved to be reliable as in a practical experiment we observed a failure rate in NLP parsing with an incidence about 1% over a corpus of nearly 20 million analyzed sentences (the error is always related to crossing of the threshold of maximum sentence length—80 words imposed by memory usage restrictions). A check over a sample of such long sentences has shown that the vast majority of them are "irrelevant sentences" in the sense that they usually show parenthetic structures.

Finally one of the strength of this patent invention relies in the co-operation and mixing of linguistics, NLP-based methods and mathematical graph analyses tools.

Furthermore, the flexibility of this methodology suggests the possibility to apply it to a number of subjects. The following topics are also part of the developed methodology of the hereto-presented invention: —Automatic incremental enhancement of the set of concepts By means of machine learning techniques, the system can detect frequently occurring phrases not recognized as concepts and add them to the concept list; thereby automatically increasing its comprehensiveness. —Introduction of trend analyses of bursts of new ideas in literature. The lifecycle of a particular association (first appearance, replication in subsequent papers, fading) gives clues about its relevance and its correctness and can be exploited as a sort of impact factor for new ideas. This will enable the system to further refine the accuracy of the link weights. —Introduction of advanced graph analysis techniques based on the dynamical properties of the graph. Exploiting the mathematical tools of the graph dynamics theory, it is possible to introduce new attributes for the links for taking into account not only its strength but also its stability i.e. its resilience to errors in evaluating the strength. This leads ultimately in enhancing the ranking capabilities of the system. —Adoption of the Linked Data paradigm. The system will find proper application within the Linked Data environment: the role of this invention could be to make connections of nodes available as RDF triples, to be exploited for other semantic applications.

Amongst all the possible uses this methodology answers the question on how a large quantity of data from diverse sources can be used to make predictions or support decision-making efforts. As technologies advance and communications become increasingly prevalent, the flow of information in the world is growing rapidly. This information is used to support decision-making efforts and predict future outcomes, and identify a strategy that uses a wide array of information to find meaningful trends, given data from diverse sources. The scientific subject matter where the concept of this invention is based upon is Complex Systems Theory, which focuses on those complex dynamic systems whose behavioural trend cannot be predicted.

In those systems, however, there are important properties known as underlying patterns that can provide a great deal of hidden correlations. Complex system analysis cannot be done by simply analyzing 'atomically' the individual element of such system but rather as a self-organize set of subsystems that organize themselves in emergent structures.

The present invention is aimed to be relevant to a range of technical fields such as econophysics, study of financial and economic trends, sociophysics, social behaviour, natural processes, the Internet, economics, finance, medicine, pharmaceutics, biology, biochemistry, biophysics, physics, chemistry, and engineering. According to an embodiment of the present invention there is provided a shift of paradigm: instead of conceiving tools to support a research process which relies completely on human initiative and invention to achieve its goals (for instance, reading the result list of a search engine or preparing and configuring a data mining system), an informative system is created and that can elaborate the large (and always increasing) amount of knowledge available in any give field and which can be charged with the duty of proposing possible emergent correlations to the enquirer. A suitable path, connecting meaningful concepts across a knowledge cloud, i.e. the information network or graph, is defined as a relevant connection amongst those concepts that is not already evident from the beginning or obtained through a direct logic implication.

It is therefore an objective of the present invention to provide a method for implementing a computer-based system for application in many different fields, able to gather semantic information from a set of natural language expressed documents (homogeneous or non-homogeneous) and to devise an efficient algorithm-based representation of the overall knowledge they provide. The characteristic of this representation, i.e. the information network, is to be dynamically built and analyzed by the system itself with the aim of mining for indirect, non self-evident relations among the expressed concepts, i.e. information units, extracted, interpreted and loaded into propriety by a multitude of sources. It is therefore a combined research and analytical tool for various industrial, financial and/or business applications, research activities and analysis that helps to maximize the exploitation of the available knowledge and therefore to suggest promising avenues of investigation or application in many different fields and industries.

In brief the system carries out a syntactic and semantic analysis of a plurality of data objects, creates a graph representation, i.e. an information network, of the knowledge contained in the data objects, e.g. documents, then uses a efficient mechanism to analyse the aforementioned knowledge network in order to discover non-immediate relations among the concepts, providing also a measure of the reliability of such relations.

It should be noted that: —a 'feed', i.e., typically a document—but if could be anything as long as it contains information expressed in natural language—is conceived as a repository of concepts, that is made of elementary items that can be referenced by different verbal expressions (e.g. synonyms, periphrasis, acronyms); —any two concepts are assumed to be related to each other—with increasing strength of the bond—if they appear in the same document, in the same sentence, syntactically closer inside the same sentence or because of other rules that identify a meaningful correlation;

The knowledge contained in the document can then be represented as a weighted graph where the concepts are the nodes and the relations defined above are links (the weight of the link is a function of the strength of the relation). The overall knowledge expressed in a given set of documents is then a weighted graph resulting from the union of the knowledge graphs of the single documents; —a path connecting two or more concepts in the knowledge graph is interpreted as a "chain of reasoning" revealing a connection between them: the interpretation is clearer if one thinks about those concepts not directly connected. The representation of knowledge in the form a graph is suitable to be continually updated by an automatic data source-reading process, and in general, applicable to any field of study or to multiple fields together; the only requirement is the availability of the basic initial dictionary. On the knowledge graph several types of processing can be carried out; here are some examples; —a focused analysis; given any two concepts it is possible to analyze the paths connecting them—if available—and to have a measure of their "relevance", which is function of the path length (an indicator of directness) and of the weight of the crossed links (an indicator of relevance). Therefore it is possible to state if a connection between the considered concepts exists in the knowledge and how reliable it is. This process is applicable also in case of a chain of concepts. —an overall analysis: the overall structure of the knowledge graph (or of any sub-graph of it) can be globally inspected by graph-reduction techniques, for instance the Minimum Spanning Tree isolation, the Planar Maximally Filtered Graph extraction, or other filtering tools, thereby gaining an overall insight on the most significant relations across the concepts and revealing the key concepts. This process can be a preliminary step of the former one, in order to identify the most interesting subset of concepts to be analyzed, or a tool for checking the compliance of the knowledge graph with the intuitively expected features of the represented notions. —Dynamic path discovery: this is the situation where an investigation on the outcome of one or more path is extracted from a graph that has been crawled by a stochastic process, e.g. a random-walk analyser, or dynamically 'disturbed' by oscillation on its links. The statistical analysis of such dynamic paths that are derived by changing the connections across concepts provides an interesting 'out of the box' view of connections that are not evident in a simple form.

Once the Knowledge Graph is built, one can be in the position to analyse it in order to highlight new scientifically analyzable relations between any two or more concepts. Embodiments of the present invention aim to search for indirect relations in the network and therefore for a path across nodes. Since all nodes in the network can be connected, these paths may always exist: the problem is to rank them (in order to find the most significant ones) and to explore and choose those paths that suggest understandable and yet non-trivial inferences.

Shorter paths can be considered more relevant, as more steps introduce new levels of indirection and magnify the effects of randomness and noise. Yet the paths should not be too short, because they should be 'verbose' enough to suggest a rationale to indicate the a mechanism similar to natural reasoning i.e. a specific interaction through which a concept is related to a chain of other concepts. Moreover, shortest paths are computed by maximizing the sum of link weights, but strong indirect connections between any given two or more concepts (nodes in the graph) may arise also from paths with smaller weights but that contribute in larger numbers. One therefore looks at all the paths that connect the two concepts and use the abundance and redundancy of these paths, together with their weights, as a measure of the strength of link between the concepts.

This can be achieved by measuring the average number of time steps required to go from one vertex to the other in the network, assuming that a walker is moving at random and at each—discrete—time step it jumps from a vertex to one of its neighbours with a probability which is proportional to the number of available links and their weights. This random walker produces a distance depending on both the length and the abundance of paths; this is a known rigorous mathematical result.

Intuitively, imagine two nodes connected by one short (one step) path and many longer ones. A random walker trying the route many times will tread the longer paths more often therefore perceiving a "long" distance. Instead, if the end points are connected with a lot of medium-[ sized paths, the walker will tread those most of the times and thus perceiving a distance shorter than the previous one. The obtained paths, given two end points appear therefore stable and strong in the sense that there are many actual paths connecting the nodes, because they are the shortest or the most weighted and relevant, due to the abovementioned characteristics of the graph.

Any simple weighted undirected graph (a graph where only a single link, without a definite direction, connects two nodes, i.e. with no loops) can be mathematically represented by means of a Similarity Matrix: the aij element of the similarity matrix is the weight of the link connecting node i and node j in the graph. Results of the theory of matrices can be applied to the matrix representing the graph.

Through the matrix representation of the graph a rigorous and exact calculation of the random walk distances is possible by pure algebraic means. The computation is carried out by defining a vector where each component is the percentage of random walkers occupying the corresponding node. The step-by-step evolution of this vector is a representation of the shifting distribution of these walkers in the nodes in their random wander.

As mentioned earlier the construction of the inferential algorithm utilizes, the shortest path technique, i.e. the path associated with the largest probability among all possible paths between two vertices. Indeed, the probability of a given path $\pi_{i,j}$=i v1 v2 ... vk j between vertex j and vertex i is: $p(\pi i,j)=p(i\leftarrow v1)p(v1\leftarrow v2) \ldots p(vk\leftarrow j)$, by extracting the strongest dependency chain between any two or more nodes. Different measures for dependency of the similarity/dissimilarity measure, i.e. the correlation measure between two nodes, can be used to explore alternative paths. However, in the present invention also a complementary perspective is used where instead of linking together nodes accordingly to the heaviest path between them one may look at all the paths that connect the two nodes and uses the abundance of these paths, together with their weights, as a measure of the strength of the linkage between the keywords. This can be achieved by developing a completely new framework based on the average number of steps required to go from one vertex of the graph to the other in the network assuming that a walker is moving at random and at each—discrete—time-step it jumps from a vertex to one of its neighbours with a probability that is proportional to the dependency between the two keywords. Let us first discuss how to build this probability and then we will see how to calculate the average walking times. As mentioned above we want a probability to move from one vertex to a neighbour which is proportional to the dependency measure $p(i\leftarrow j) \propto s_{i,j}$. If we assume that the walker must always move to one of its neighbours at each time step, then it is clear that the probability to move to anyone of its neighbours must be equal to one: $\Sigma_j p(i\leftarrow j)=1$. The combination of these two assumptions imply univocally $p(i\leftarrow j)=s_{i,j}/\Sigma_k s_{i,j}$.

The matrix P with elements $(P)_{i,j}=p(i\leftarrow j)$ is often refereed as transfer matrix. By defining a weight proportional to the concepts co-occurrences, $w_{i,j}=s_{i,j}/\Sigma_k s_{k,j}$, we can clearly see that they coincide with the above probabilities, which are therefore conditional probabilities, $p(i\leftarrow j)=p(j|i)$, expressing the chance to find concept 'i' within a phrase containing concept 'j'. This is the probability that we adopt for our random walker on the network. If, at each time-step, the 'walker' jumps at random form a given vertex to one of its neighbours in the networks with probability given by $p(i\leftarrow j)=s_{i,j}/\Sigma k s_{i,j}$, then the average number of steps required to go from vertex i to vertex j is: Random Walk Distance $dRW_{i,j}=\Sigma_i \leftarrow N[1/I-B(j)]$ where N is the number of vertices in the network, I is the identity matrix and B(j) is a N×N matrix which is identical to the transfer matrix P (with $(P)_{i,j}=p(i|j)$) except that $B(j)_{i,j}=0$ (for any $i \in [1,N]$). Let us notes that dRW is asymmetric as the walker does not take the same i,j average number of steps to go in one direction or the other. This is a direct consequence of the asymmetry of the transfer matrix P which, in turns, is due to the renormalization of the similarities by the vertex strength. This means that it is much less likely for the walker to take a path through a hub, because by doing so he will be 'lost' in a large daedalus of equivalent exit directions.

The RW distances defined above is an implicit ranking measure for each couple of distinct nodes couple. Moreover the distances between two nodes are used as weight of the links of the original graph to draw the shortest path in the new graph as described above. Such path is obtained from the knowledge graph built upon the col[ occurrences of concepts semantically analysed and without being filtered. At this point of the methods the symmetric random walk distances are calculated and for each pair of nodes a random walk distance measure is defined. By doing so we obtain a complete graph (each node connected to every node) and each pair is connected by a link whose weight is indeed the random walk distance between the two nodes. Now, from the new "virtual" graph obtained we eliminate all direct links peptide-disease present in the original graph and all shortest-paths are then recalculated.

One may find a characteristics of the present invention in that it makes no use of a predefined, manually curated ontology as a knowledge representation, as it is common to see in any other semantic applications already out there. According to the present embodiment the concepts that the search system will search are defined in a dictionary, but the search will let sentences themselves draw the relations among them. Specifically, it uses, for example, the verbs to characterize the type of interaction. As such, the allowed type of interaction is not imposed, as it is done conventionally. And, each relation is given a measure, i.e. a weight, depending on the syntactic structure of the sentence it is extracted from.

The knowledge representation that is obtained is formally a graph with nodes and links, but it's meaning may differ torn the one of the conventional ontologies. It considers more than one kind of relation between concepts; thus, the concept of the present invention can describe complex and layered relations and even deal with contradictions. In such cases, were documents teach a first relation, for example between A and B, and a different document teaches a different relation between A and B, potentially even contradicting information from the first document, the present embodiment provides a solution according to which the search engine considers all the relations it can find between A and B. During this process, it may thus be the case that the overall relation between A and B is getting stronger or weaker and the overall relation is defined by a dynamical characterization of the weight of the relation.

Among many other examples, for an example in the biotechnical field, the present machine-based search method processed and analysed more than 3 million documents on biomolecules, bio-molecular pathways and a certain set of diseases with their clinical data and found that many statements in various documents were strengthening existing relations and other were weakening them. The resulting information network is a graph that is dynamically self-assessed.

The system proposes a great number of possible—direct and indirect—interconnections, i.e. paths, between two concepts, properly ranked according to their total weight. Among those paths one may find well-known facts, false positives and new unexpected meaningful connections. The latter paths represent a sort of "chain of reasoning" that provides the scientist a lead for further investigations.

In striking contrast, an ordinary ontology cannot provide anything other than well-known facts and straightforward inferences.

Further differences from ether existing semantic engine/databases:

Other than what aforementioned, other semantic engines/databases based products are mainly focused onto interpreting data in the correct context for example of a performed experiment, i.e. in scientific applications. This is done by a huge, manually curated ontology. Therefore, their suite of applications does not seem to be able to propose any new hypothesis in terms of correlation. Their claim about discovering new relations is true when this system is fed with new certain data; and this can be done only after it has been decided to work on a specific hypothesis. These are mainly tools for developing an existing idea with plenty of data that need to be cross-correlated in a project, not for starting a brand new lead of investigation or even catching the emergent property that relates a number of atomic elements through multiple sub-system apparently un-correlated.

In other words the strength of those tools and their strength is to highlight straightforward inferences. This conventional system may thus miss some interactions or simply choose to ignore some that could potentially be quite important.

As pointed out above, an item missed by the system because it does not find cross-correlation is overcome by the ability to handle millions sources, incomplete or scattered as they are. The present methodology, summing up al the contributions, is able to identify relationships amongst concepts as an emergent property of the overall knowledge base. For instance, a correlation between two concepts may be missing in a set of feeds, but it can be recovered nonetheless considering indirect relations provided by other feeds on the same subject. In general, two concepts—say two any CDRs (call detail record) in a telecom operator traffic database or a biomolecule and a disease, are connected by several possible paths in the knowledge graph but the existence of many other paths will anyway show that the two concepts are significantly, albeit indirectly, connected. Another example is the collection of a variety of economic and political information that only when correlated and analysed in a graph structure can unveil unseen paths leading to the identification of a trend or a shock. This is one of the strength of the present invention, i.e. the capability to reconstruct a reasoning process by connecting concepts (even if partially described and scattered across many sources) and mimic a sort of synapses-neurons process of reasoning; in a way we can say that what we call 'an intuition' performed by our brain is the connection of a set of correlated data that appear not directly linked but emergent from hidden paths. This is what the present invention implement through its mechanics.

It is arguable whether the Natural Language Process (NLP) approach misses some interactions that do not conform to NLP algorithms. NLP may not be involved for the build-up of the interactions between concepts. NLP in this model is only the first step of the elaboration; its aim is to break down each sentence into its syntactic tree representation (parse tree), which will play the role of the atomic unit of raw information. There may be no search of concepts or their interrelation at this NLP stage of elaboration. However, the adopted NLP engine proves to be reliable.

Data insourced from multiple feeds can be inaccurate. Of course the relevance of a link between concepts grows as the connection is cited more and more in data insourced; it is true then that an old wrong relation influences the results however is also true that even correct relations cease to be cited once they become common place. This is just one aspect of the interesting phenomenon of bursts: any given idea pops up suddenly and is repeated more and more in other sources if it raises interest and then slowly fades regardless of its correctness.

Moreover, a good windowing technique can identify such trends: one of our research items is the analysis of such trends in order to evince emergent properties such as the correctness of a connection. The proprietary and public tools available all do filtering, shortest path and random walk.

The filtering techniques are common places in graph theory, and so no wonder to find them whenever a graph is involved. It is the meaning of the graph that makes a qualitative difference with the ontology-based approaches. The peculiarity of this approach is the possibility to retrieve unexpected interrelations as emergent properties of our knowledge graph that is unbiased, fully data-driven and automatically built.

For understanding the meaning of paths in this invention's context if should be noted: the Shortest Path techniques provide rationales of the connection between the two end point concepts; therefore, it represents a chain of reasoning and possibly a newly discovered and unexpected one. Moreover, the use of random walk analysis for ranking purposes is quite un-common in our reckoning.

The proposed method may employ as input the following: —a set of digital documents or any other digitized feed expressed in any natural language; —a taxonomy of concepts, that is a dictionary where for each concept if is specified the words and phrases denoting it and, optionally, one or more labels identifying the categories the concept belongs to; in an embodiment, the method unfolds itself in the following way:

1. an ingestion step: the elaboration of the natural language expressed documents to search for any concepts and links, the extraction and the building of the knowledge graph; 2. a Correlated Analysis step: the analysis of the knowledge graph scanning for relevant direct and indirect relations among concepts. These steps exploit the powerful many properties of efficient algorithms that allow to walk the Graph, filter it, highlight emerging properties and propose multiple output, not only the most straightforward. These include: random walk process, shortest path, constrained shortest path, maximum entropy, dynamic gradient analysis, and many others. As for the first step, the system runs on every document a syntactic parser (a Natural Language Processing machine) and a semantic analysis (a lookup on the occurrence of concepts, as configured in the dictionary/taxonomy) at the end of which are produced a list of concepts and a list of cross-referenced links which are derived from an analysis of various factors including co-occurrences, semantic distance, characterization of the predicate tense (verb).

The specific technique employed for the probabilistic NLP parsing and for the semantic analysis can be freely chosen: the only condition is for the semantic analyzer to be configurable through a dictionary-taxonomy to define the semantic field of research. Once the concepts are interpreted as nodes, the aforementioned creation of cross-referenced links provides a measure of relevance that is used to provide a weight to the corresponding link, and then a knowledge graph is constructed. It must be emphasized that as the number of data fed into the system increases the accuracy and the relevance that each links assumes is dynamically improving; in other words the system delivers an impressive self-learning behaviour where correlation across concepts become stronger and more precise when the system keeps on analyzing new data and build up new measures of relevance across correlation. Moreover, it is important to point out that a graph is a mathematical instrument derived from the large algebra and matrix theory.

A further preferred embodiment of the present invention is described in detail below. The present embodiment enables collecting and analyzing natural language expressed sources (data objects) in order to retrieve information about the semantics articulated by the authors and to make this information available to search machines for massive elaboration, and ultimately to users. The aim of this embodiment is to provide suggestions and evidence to users, for example researchers, on the possible connections and developments about pre-defined, specific subjects without let them skim through the vast sea of available literature.

According to the present embodiment, the process may be based on any of the following steps: Natural language expressed information (Sources or data objects in the following) are gathered from their original archives—e.g. digitized archives, World Wide Web sites, local public or private repositories—pre-configured as available input sources. Then, after the source is extracted it is broken down in its constituent sentences. A sentence then may undergo a Natural Language Processing (NLP) analysis so that a parse tree is provided for if. The large database of sentences processed as parse trees is then semantically analyzed, by researching concepts defined in the dictionaries. Here, the present embodiment relies on at least one dictionary for any supported language and for any subject of analysis or field of study or domain. The next step is the identification of the co-occurrences of concepts in each sentence, and its enrichment with co-occurrence properties, such as the verb qualifying the relation itself and measures of relevance.

The complete set of interlinked concepts is represented as a weighted graph to be further analyzed by graph-theory based mathematical tools to search for emergent patterns, highlighting or detecting unnoticed and indirect relations among concepts.

Specifically, paths—i.e. indirect relations among concepts—can be interpreted as complex inferences never explicitly expressed in any source sentence or document. If, for example, the relation "A implies B" is identified from a source and the relation "B implies C" in identified from another source, i.e.

Source 1: A→B - - - Source 2: B→C

Even if the inference A→C, i.e. A implies C, is never mentioned in any source paper, the system according to the present embodiment will be able to build it from its constituent parts, leveraging on the graph representation of interlinked concepts. The graph produced by the two sentences has in fact the simple form A→B→C and A→C is one acceptable connection, i.e. a correlation between A and C. Obviously, in a complex data structure the chain of inferences are much longer than three elements and in this case the system will produce an inference path X→Y. In a further step according to the present embodiment, the search machine may rank these paths according to a measures of relevance based on link weights.

A further preferred embodiment of the present invention is described in detail below on the basis of a biomedical example and in conjunction with FIGS. 1, 2A, 2B, and 3A to 3C. Although the concept of the present invention may be applied in many fields of investigation; in the following embodiment, it is shown how the search system is able to detect relevant concepts torn given text sources and documents and how it draws indirect connections (inferences) among extracted concepts. Among many other examples, as a specific and detailed one, the abstract of three biomedical articles published on PubMed are exploited (PubMed is a digitized database containing millions of biological and medical papers that are available on a distributed network connecting servers and clients).

The texts have been chosen from PubMed database to deal with the peptide Adrenomedullin, i.e. a small chain of Aminoacids, in order to find significant inferences, through a number of biological pathways, to a small set of diseases, such as heart failure, reperfusion injury, epilepsy, and/or pulmonary hypertension. In the sources chosen for this example, there is no explicit connection or correlation stated between Adrenomedullin and Epilepsy, while there is one between Adrenomedullin and Reperfusion injury for instance. In the following, it will be shown how the search system can analyze these sources, extract relevant information and draw the indirect connection between Adrenomedullin and Epilepsy. The content of the selected sources for the present embodiment are shown below:

Source 1:

Adrenomedullin—what do we know 10 years since its discovery?

Adrenomedullin (ADM) is a 52-amino acid peptide with structural homology to calcitonin gene-related peptide j (CGRP) initially isolated from human pheochromocytoma. ADM is vascular smooth muscle cells, myocardium and central nervous system. ADM binds to plasma membrane receptors composed of calcitonin receptor-like receptor (CRLR), a member of serpentine receptor superfamily, and receptor activity modifying protein (RAMP) type 2 or 3. ADM has also some affinity for CGR(1) receptor composed of CRLR and RAMP1. ADM dilates blood vessels in both endothelium-dependent and independent manner and decreases systemic arterial pressure. Intrarenally administered ADM increases natriuresis by vascular and tubular mechanisms. In addition, ADM inhibits migration and proliferation of vascular smooth muscle cells and attenuates myocardial remodelling by inhibiting protein synthesis in cardiomyocytes and proliferation of cardiac fibroblasts. ADM is expressed in various tissues torn early stage of embryogenesis and is also synthesized in placenta, uterus and fetal membranes. Plasma ADM level is increased in arterial hypertension, acute coronary syndromes, heart failure, renal diseases and septic shock, being involved in the pathophysiology of these disorders. Experimental ADM treatment is beneficial in arterial and pulmonary hypertension, heart failure, septic shock and ischemia/reperfusion injury. Proadrenomedullin N-terminal peptide (PAMP) is another product of ADM gene which is co-secreted by ADM-producing tissues, with some effects similar and some opposite to ADM.

Source 2:

Evidence for decreased calcitonin gene-related peptide (CGRP) receptors and compromised responsiveness to CGRP of fetoplacental vessels in preeclampsic, pregnancies. Calcitonin gene-related peptide (CGRP) is a potent vasodilatory peptide, and its concentration is increased in both maternal and fetal circulation during late pregnancy. The present study was designed to investigate the expression of CGRP receptor components, calcitonin receptor-like receptor (CRLR), and receptor activity modifying protein 1 (RAMP1), and the relaxation response to CGRP in fetoplacental vessels from normotensive pregnant women and women with preeclampsia. Results showed that: 1) mRNA for both CRLR and RAMP1 was expressed in fetoplacental vessels torn normal pregnancies; however, these mRNA expressions were substantially reduced in the vessels from preeclamptic women; 2) CRLR and RAMP1 proteins were abundantly expressed in the endothelium and smooth muscle layer of the fetoplacental vessels, as well as the trophoblast cells in normal placentas, in contrast, both vascular tissues and trophoblasts showed decreased expressions for CRLR and RAMP1 proteins and declined CGRP binding sites in preeclamptic placentas; and 3) CGRP moderated serotonin-induced contraction of umbilical and chorionic arteries from normal pregnancies, but the response to CGRP was significantly attenuated in the vessels from preeclampsia. We concluded that CGRP may contribute to the low fetoplacental vascular resistance in normal pregnancies: however, CGRP-dependent vascular relaxation appears to be compromised in preeclamptic pregnancies.

Source 3:

This inhibition of epileptiform activity by serotonin in rat CA1 neurons. This investigation was performed to determine the ability of serotonin in inhibiting bicuculline induced epileptiform bursts in brain slices of male Sprague-Dawley rats. In all experiments, intracellular recording techniques were employed on CA1 neurons of the hippocampus. The neurons were stimulated either directly by the recording electrode or indirectly (synaptic stimulation) using a bipolar electrode placed on the CA2/CA3 region. Serotonin (20 microM) inhibited the directly evoked bursts of action potentials and caused a membrane hyperpoiarization and decrease in membrane input resistance in untreated CA1 neurons. In the same experiments, serotonin inhibited the synaptically evoked action potential as well. Additionally, serotonin inhibited epileptiform bursts induced by single presynaptic stimuli in the presence of bicuculline. Moreover, in the concomitant presence of serotonin and bicuculline, there was a decrease in the number of spikes in bursts evoked by direct stimulation. Inhibition of epileptiform bursts was also achieved with the selective SHT1A agonist 8-hydroxydipropyl-amino-tetralin (8-OH-DPAT). The presence of the 5-HT3 antagonist MDL 72222 (30 microM), and the 5-HT2 antagonist ketanserin (3 microM) did not influence the ability of serotonin to inhibit epileptiform bursts. In the presence of bicuculline, the inhibitory action of serotonin, S-OH-DPAT or the combination of serotonin, MDL 72222 and ketanserin, was accompanied by a membrane hyperpoiarization and a decrease in membrane input resistance. To ascertain if serotonin can be applied on other models of epilepsy, as well, we demonstrate the inhibition of epileptiform activity in the kainic acid treated brain slice preparation.

In order to analyze the content of these sources a dictionary containing a set of known concepts is defined.

| CONCEPT | FAMILY |
| --- | --- |
| ADRENOMEDULLIN | PEPTIDE |
| CALCRL | RECEPTOR |
| CGRP | PROTEIN |
| CARDIOMYOCYTE | CELL |
| ENDOTHELIUM | CELL |
| EPILEPSY | DISEASE |
| FIBROBLAST | CELL |
| HEART_FAILURE | DISEASE |
| ISCHEMIA | DISEASE |
| MIGRATION | PROCESS |
| PLACENTA | ORGAN |
| PULMONARY HYPERTENSION | DISEASE |
| PROLIFERATION | PROCESS |
| RAMP | RECEPTOR |
| REPERFUSION_INJURY | DISEASE |
| SEROTONIN | HORMONE |
| SMOOTH_MUSCLE_CELL | CELL |
| UTERUS | ORGAN |

Every concept is assigned to a category and/or or a family, which may be used for performing resource constrained shortest path analysis. In addition, family may further be used in the creation of a dictionary to describe synonymous and/or hard-coded relations that are deemed invariant in the analysis process.

Further, to each concept is attached a list of words and phrases—eventually expressed as regular expression for greater flexibility. A concept is said to occur in the text whenever at least one of those phrases/expressions/synonymous is found. For instance, the dictionary of concepts may contains entries like ADRENOMEDULLIN→adrenomedullin, ADM, AM, . . . ; CALCRL→CALCRL, CRLR, calcitonin receptor-like receptor, . . . SEROTONIN→serotonin, 5-HT, 5-hydroxytryptamine, . . . .

In order to qualify the interaction and/or correlation among biomedical concepts, if is necessary to define a list of key verbs expressing basic relations, i.e. correlation-indicating elements. In analogy with the concept dictionary, for every relevant verb, we define a list of words and phrases to be searched for in the text. For every verb defined as correlation-indicating elements, a list of synonyms and/or flexed forms, i.e. idioms of it, may be defined in the dictionary. For instance, in the present embodiment for a biomedical example, correlation-indicating elements are defined as INHIBIT→inhibit, inhibited, block, blocked, . . . ; RELIEVE→relieve, relieved, relieving, being beneficial, is beneficial, . . . ; IS_PART_OF→is part of, composed of, composed by, . . . .

Initial Setup (Concept Detection and Connections/Correlations)

A simple search for words within the text documents would detect mere co-occurrences but with no information whatsoever about the kind of relation specified.

For instance one of the input sentences reads (concepts are highlighted):

In addition, ADM inhibits migration and proliferation of vascular smooth muscle cells and attenuates myocardial remodelling by inhibiting protein synthesis in cardiomyocytes and proliferation of cardiac fibroblasts.

Of course "cardiomyocytes" and "fibroblasts" do occur in the sentence but they are not meaningfully related, while "ADM"—which is the concept "ADRENOMEDULLIN"—and "migration" and "proliferation" are. The relation for instance between "ADM" and "migration" can be detected as the triple: ADRENOMEDULLIN→INHIBITS→MIGRATION, while no such thing is possible for the co-occurrence "cardiomyocytes" and "fibroblasts", this one is therefore discarded.

Figure 2A:
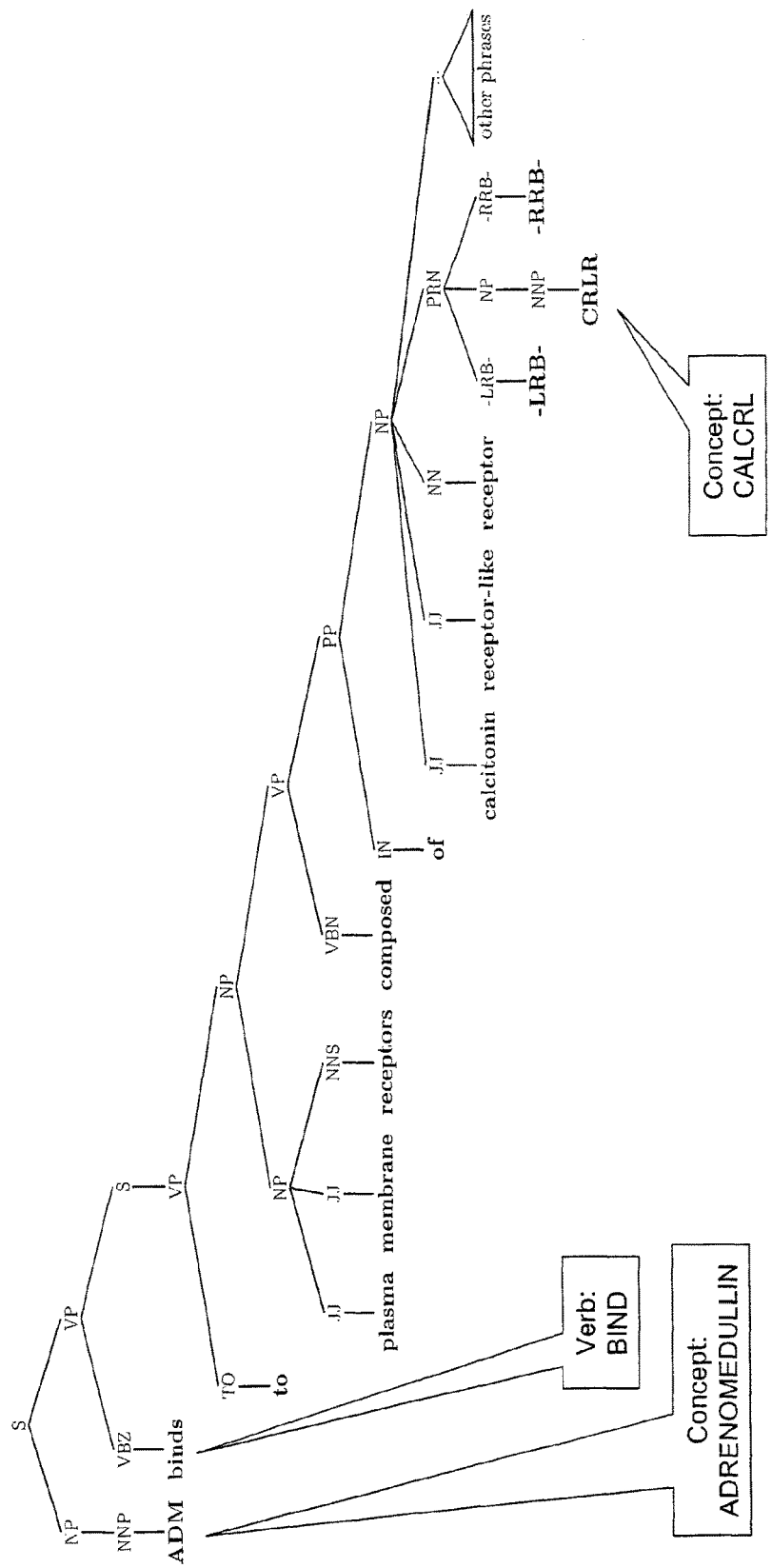
FIGS. 2A and 2B show exemplary schematic representations of a semantic analysis according to an embodiment of the present invention.
Figure 2B:
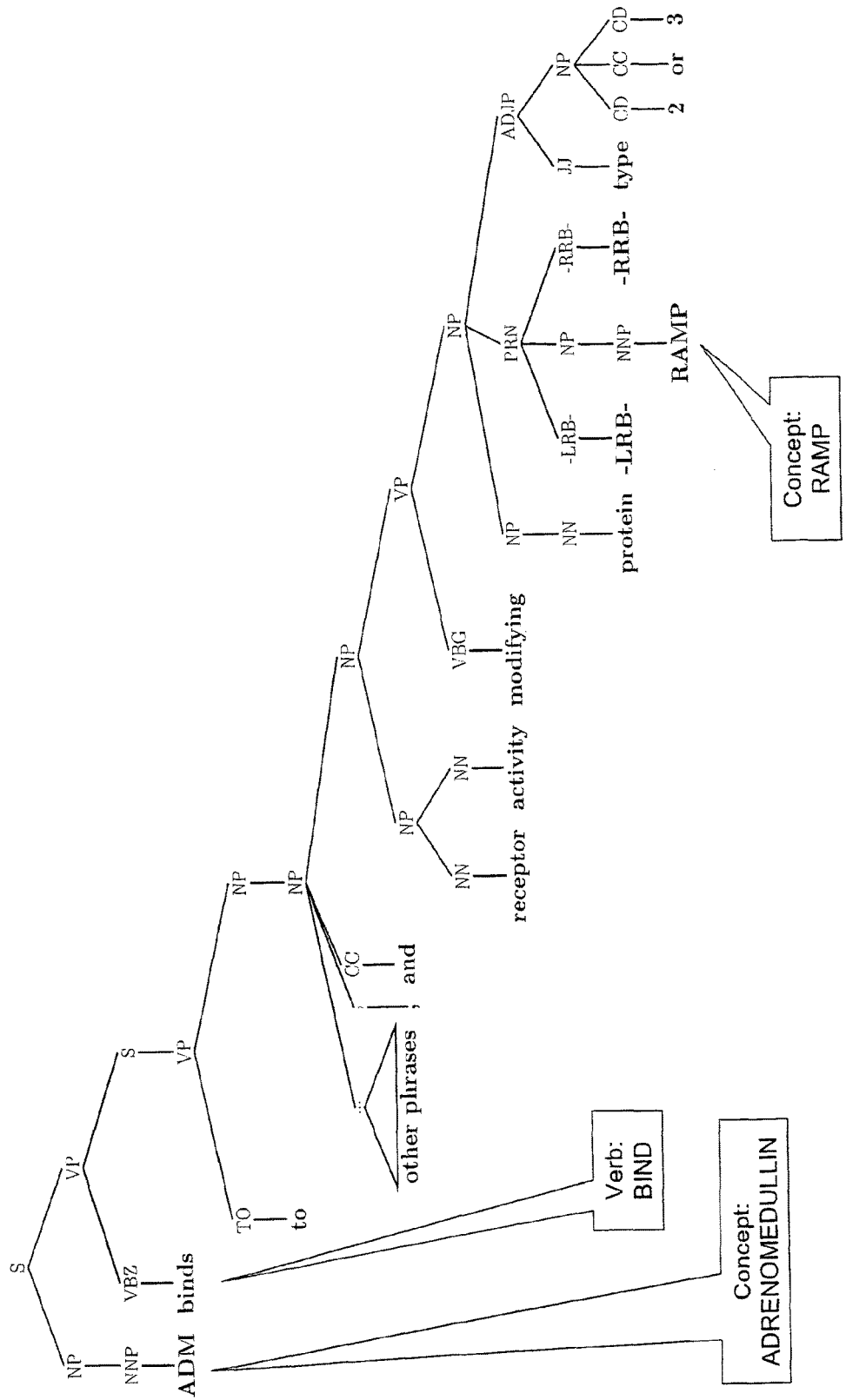

As previously explained, every sentence may be parsed and reorganized according to its syntactic structure. When, for instance, the sentence:

ADM binds to plasma membrane receptors composed of calcitonin receptor-like receptor (CR receptor superfamily, and receptor activity modifying protein (RAMP) type 2 or 3. is parsed, a tree-like representation as shown in FIG. 1 may obtained, that may use, for example, the Penn Tree-Bank standards for semantic analysis. In FIG. 1, for example the Penn Tree-Batik standards refers to a Noun Phrase (NP), a Noun Part (NNP), a Verbal Phrase (VBZ), a Verb, third person singular present (VBZ), a Coordinating Conjunction (CG), a Verb, Gerund or Present Participle (VBG), etc. Traversing the parse tree, such as shown in FIG. 1, it is possible detect relations that are held together by a verb. For instance in the previous tree structure, the relation "ADM binds to CRLR" produces the triple ARENOMEDOLLIN→BINDS→CALCRL, as shown in FIG. 2A. The same parse tree provides also another meaningful relation, namely "ADM binds to RAMP", that produces the triple ADRENOMEDULLIN→BINDS→RAMP, as shown in FIG. 2B.

Building the Knowledge Graph

By parsing and analyzing all the sentences coming from the sources, several relations may be detected: ADRENOMEDULLIN→BINDS→CALCRL; ADRENOMEDULLIN→ BINDS→RAMP; SMOOTH_MUSCLE_CELLS→SYNTHESIZES→ADRENOMEDULLIN; PLACENTA→SYNTHESIZES→ADRENOMEDULLIN; ADRENOMEDULLIN→INHIBITS→MIGRATION; ADRENOMEDULLIN→RELIEVES→ISCHEMIA; ADRENOMEDULLIN→RELIEVES→REPERFUSION_ INJURY; HEART_FAILURE→INCREASES→ADRENOMEDULLIN; SEROTONIN→INHIBITS→EPILEPSY. Some of the relations appear more than once—e.g. the relation SEROTONIN→INHIBITS→EPILEPSY appears three times in the third text. The frequency of this occurrence is accounted for as one of the measure of relevance of the relation. Another more sophisticated measure takes into account the distance of two concepts in the parse tree, thus introducing a modulation in the simple 0-1 contribution of the sole occurrence.

Figure 3A:
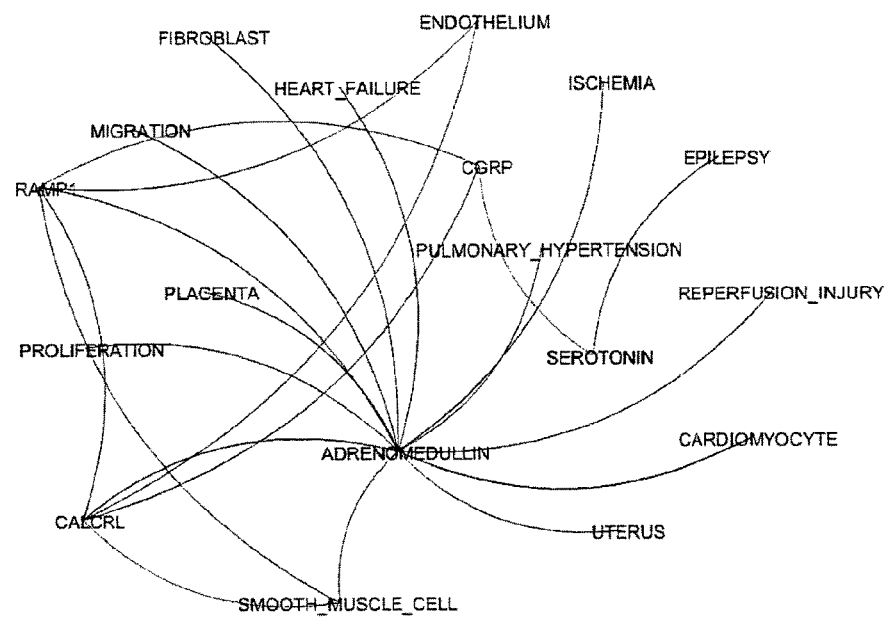
FIGS. 3A to 3C show exemplary schematic representations of information networks according to an embodiment of the present invention.

The complete set of the detected relations is represented in an information network, such as the graph shown in FIG. 3A, wherein the nodes of the information network refer to information units, i.e. the concepts defined in the dictionary, such as EPILEPSY, SEROTONIN, HEART_FAILURE, etc., and wherein the links of the information network refer to correlations that are detected based on the correlation-indicating elements defined in the dictionary, such as BINDS, SYNTHESIZES, INHIBITS, etc. Moreover, the links established for the information network are measures of relation relevance define by a weight for the links of the graph. FIG. 3A is, for example, obtained by considering all the concepts and verbs detected in the three PubMed abstracts of this example.

Analysis of the Graph

Further, a processing entity having a processing unit that is configured to perform the above steps 210-240 of the present embodiment is further configured to perform a series of analysis in order to highlight the emerging properties of this complex information network, i.e. the graph. In the present embodiment, the graph is analyzed in order to find the most relevant path between Adrenomedullin and the initial set of diseases.

Those direct paths that are considered trivial, because it is supposed they are already known, for example because the direct path is known from a single document, e.g. from one of the above Sources 1-3, and are therefore discarded or highlighted as "trivial" findings. ADRENOMEDULLIN→RELIEVE→ISCHEMIA; ADRENOMEDULLIN→RELIEVE→PULMONARY_HYPERTENSION ADRENOMEDULLIN→RELIEVE→REPERFUSION_ INJURY; HEART_FAILURE→INCREASE→ADRENOMEDULLIN.

Figure 3B:
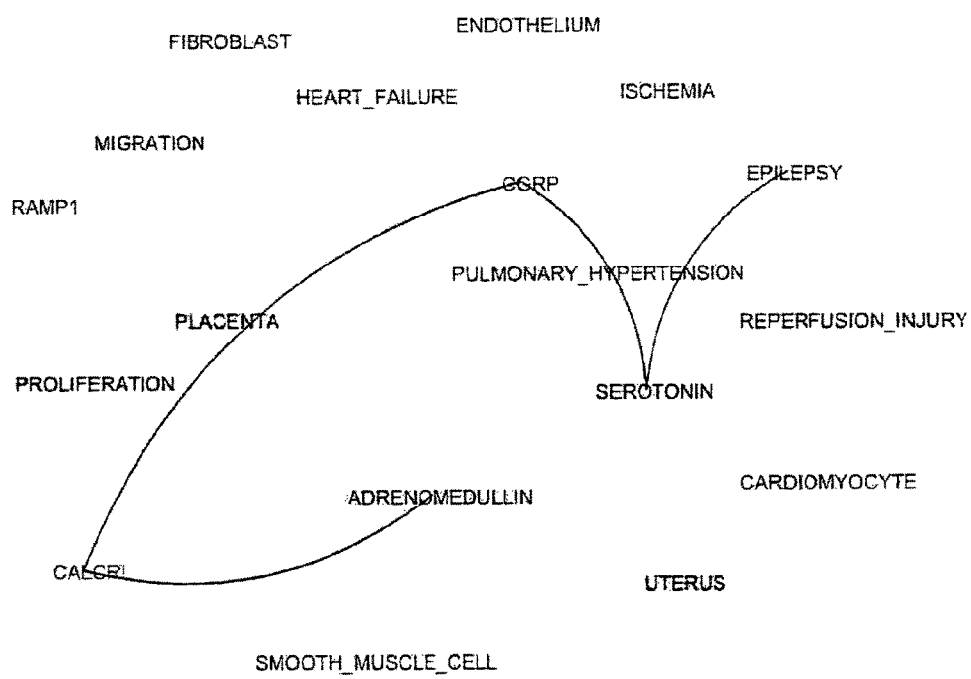
Figure 3C:
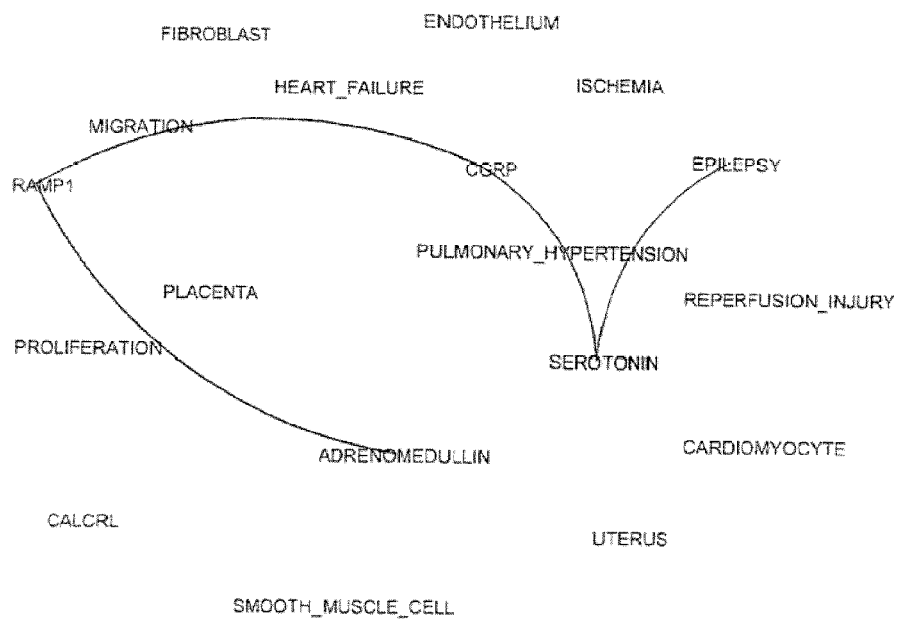

As a result of the above discarding of direct paths, indirect paths emerge and thus show emergent properties, as for example shown in FIG. 3B, indicating an emergent and previously unknown connection between Adrenomedullin and Epilesy via CALCRL, and also shown in FIG. 3B, indicating an emergent and previously unknown connection between Adrenomedullin and Epilesy via RAMP. In plain text format the two indirect paths read: (1) ADRENOMEDULLIN→BIND→CALCRL→IS PART OF→CGRP MODERATES→SEROTONIN→INHIBIT→EPILEPSY; (2) ADRENOMEDULLIN→BIND→RAMP→IS PART OF→CGRP→MODERATES→SEROTONIN→INHIBIT→EPILEPSY. From a human perspective, both the emerging paths state that Adrenomedullin worsen Epilepsy, as if moderates Serotonin, which is said to be an Epilepsy inhibitor. This is a statement that offers an inference that contains its own rationale.

Path Ranking

According to the above example of the present embodiment, for the sake of argument only two paths have been described and although they might look too little information in the above examples it gives statistically meaningful indications, in fact, considering millions of data coming from several sources and thousands of concepts and verbs, there are many more indirect and meaningful paths to tackle with. It would be impossible for humans to find and gauge all indirect inferences. Therefore, the search system provides an optional, automatic ranking of the paths based on link weights. The most straightforward relevance measure for paths is the overall weight of a path—i.e. the sum of the link weights. More sophisticated measures can be obtained using functions of link weights other than a simple sum. Also, a different measure is introduced that does not take into account the specific path but a sort of overall connectivity/correlation measure between the end point concepts of a path. This measure represents the end-to-end probability of travelling from concept A to concept B moving randomly across the graph. Since this measure is equal for paths sharing the same two end points, it is used for ranking the relative strength of correlation among different couples of concepts.

Because the knowledge-based information network that has been constructed is a powerful mathematical tool there are a number of theorems and instruments inherited from mathematics, statistics and physics that have been applied in order to filter, interpret and generally analyze the relationship across each nodes of the graph. These include; stochastic methods, theory of signals, entropy bases analysis, network theory etc.

Figure 4:
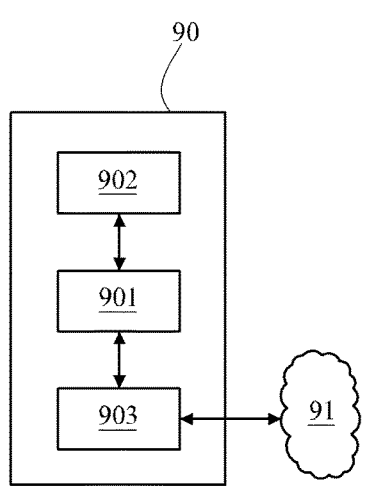
FIG. 4 shows a schematic representation of a processing entity according to an embodiment of the present invention.

FIG. 4 shows a schematic representation of a processing entity according to another embodiment of the present invention. As shown in FIG. 4 a processing entity 90 comprises a processing unit 901 and a memory unit 902. In the memory unit 902 there are memory sections storing data and/or code in order to provide the functions of the embodiments of the present invention. The processing entity 90 further comprises a communication unit 903 adapted to communicate via a network 91 to other entities of the described system and/or networks such as the Internet. The latter may be employed to insource the mentioned data objects.

Figure 5:
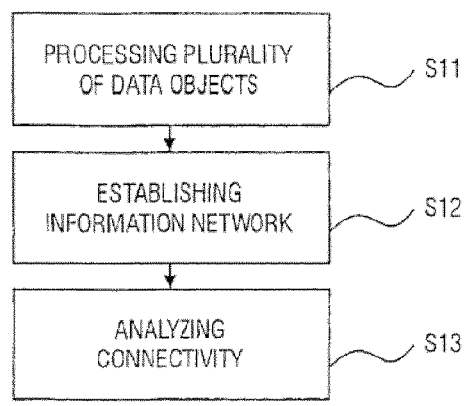
FIG. 5 shows a sequence diagram of a method embodiment of the present invention.

FIG. 5 shows a flow chart of a method embodiment of the present invention. Accordingly, a machine-implemented method of relating a two or many information nodes in an information network, comprises a step S11 of processing a plurality of data objects according to a predefined dictionary containing a plurality of information units and a plurality of correlation-indicating elements to detect in the plurality of data objects the presence of a correlation between respective information units. The method further comprises a step S12 of establishing an information network with a plurality of information nodes and links between the information nodes, said information nodes being related to said information units and said links being related to said detected correlations. The method further comprises a step S13 analyzing a link connectivity state of said information network to find a path across multiple information nodes being input by a query searched by a user.

Another example for applying the present invention is directly derived from the multitude of financial information created every day about stock markets, companies' performance, market indexes etc.; these information show a great deal of direct and indirect relationships and the high dynamics of their natures make very difficult to construct patterns. Via the presented invention it is possible to build a dynamic database of data and its links that constantly would show emerging patterns and, because their volatility, their trends.

Moreover, another application can very well be fit into any of the social behavioural analysis where it is important to trace paths connecting behaviours (nodes) and identify unexpected relationships. This could apply to social network, telecommunication "call analysis", contact relationship analysis and other.

As a further embodiment, said information units and/or said information nodes define any one of an object term related to an industrial, business or scientific research and analysis applications such as an econophysics, business and finance, economics, sociophysics, telecommunications, media, social, medical, biochemical, biomolecular, chemical, technical, and a pharmaceutical term. According to further embodiments, said terms define any one of an object, a node or concept related to the areas of applications described and that are deemed to be constituent objects, i.e. concepts, of their related field such as: for medical, pharmaceutical, biochemical, biomolecular applications, for example and without being limited to those, a drug, an active ingredient, an active agent, a medical compound, a chemical compound, a pharmaceutical compound, a therapy, a cure, a cause, an elect, a disease, a symptom, a disease symptom, a diet, a nutrition, a lifestyle feature, a habit, a pathogenesis, a disease cause, a disease pathogenesis, an item associated with a disease, and an item associated with a pathogenesis of a disease; for business, econophysics, financial applications a parameter indicating, for example and without being limited to those, price, trends, micro-economics and macro-economics definitions or concepts, statistical similarities; for telecommunications and media applications, for example and without being limited to those, a CDR (call detail record) an object defining the status of a subscriber or a line, interactions between or across multiple lines, statistical correlations; for a social application any concepts identifying statistical behaviour and its dynamics.

Figure 6:
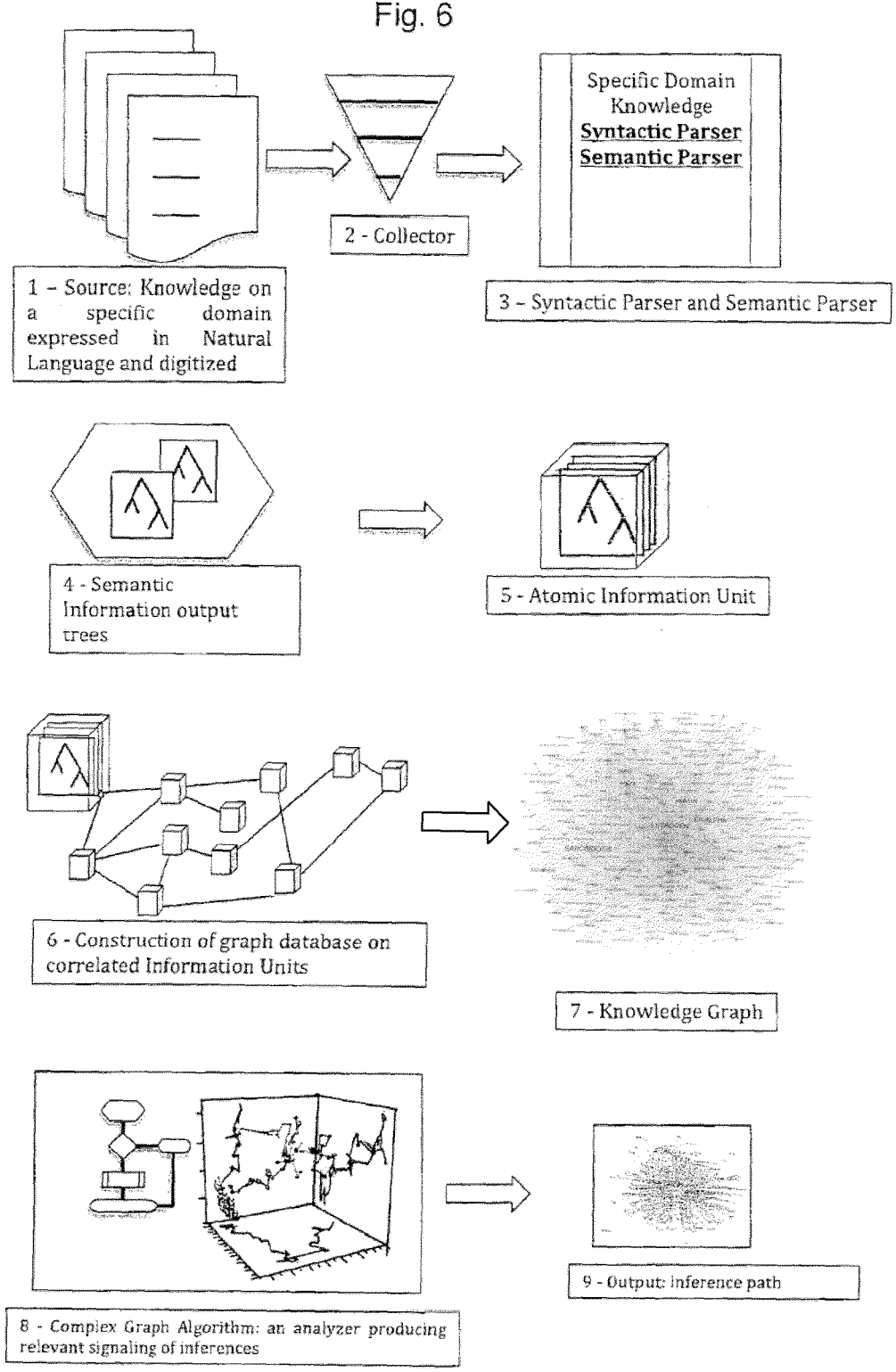
FIG. 6 shows an overall schema of an embodiment of the invention constituted of 9 blocks.
Figure 7:
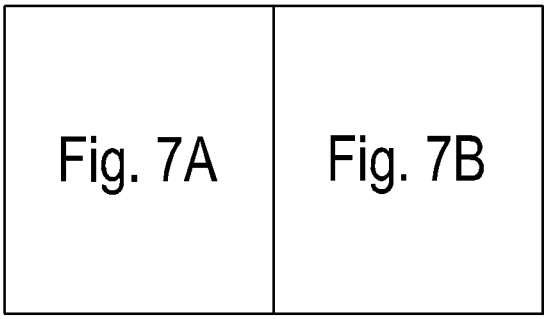
FIG. 7, which includes FIGS. 7A and 7B in two parts, shows a biological knowledge graph derived from processing 250,000 scientific abstract papers, with a focus on 2100 biological entity. The FIGS. 3A, 3B and 3C derive from here upon graph filtering techniques and subsequent algorithms described in the present invention.
Figure 7A:
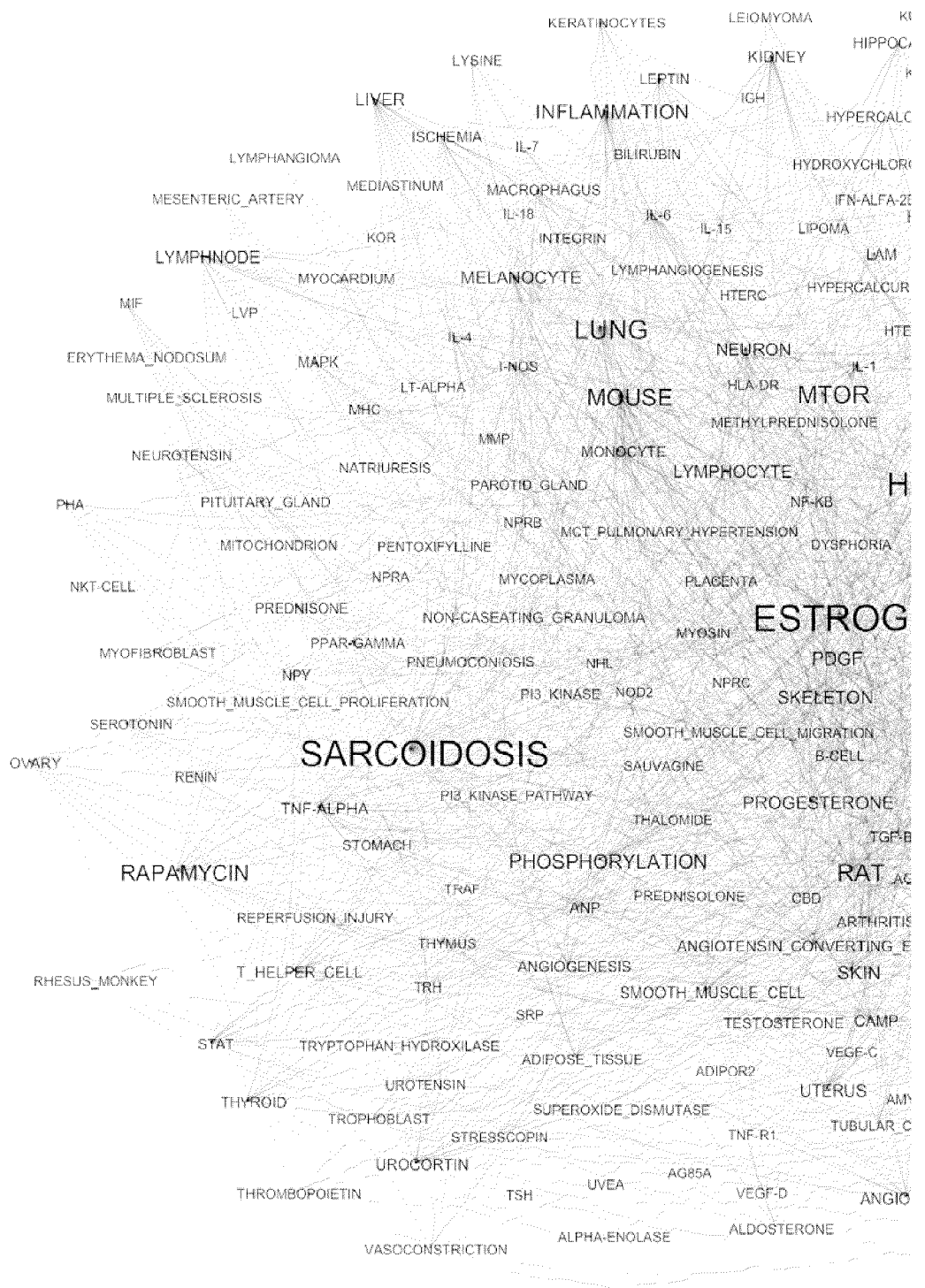
Figure 7B:
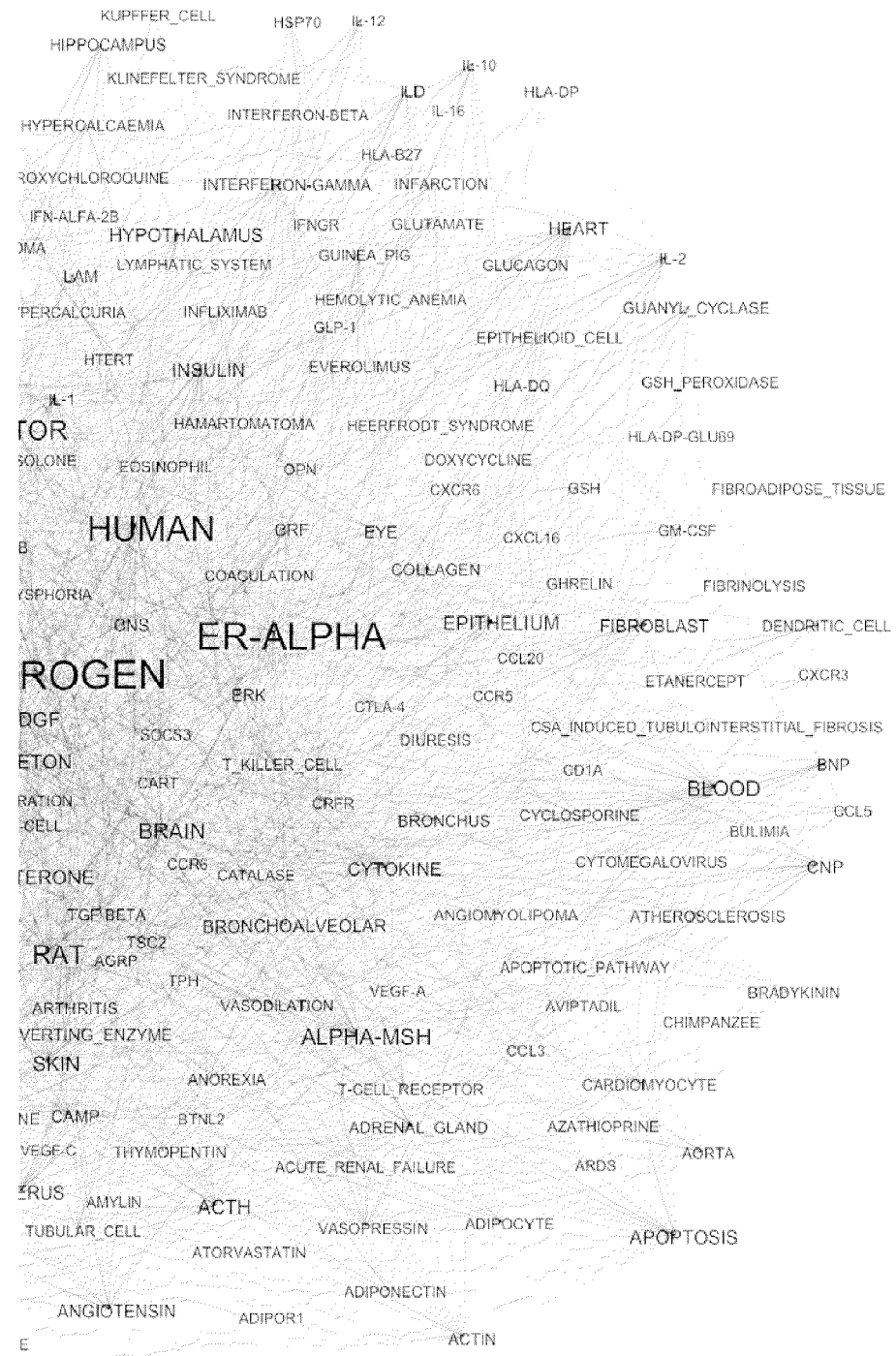

FIG. 6 shows an overall schema of an embodiment of the invention constituted of 9 blocks and FIG. 7 shows a biological knowledge graph derived from processing 250,000 scientific abstract papers, with a focus on 2100 biological entity. The FIGS. 3A, 3B and 3C derive from here upon graph filtering techniques and subsequent algorithms described in the present invention. In general, knowledge graphs as those for example shown in conjunction with FIG. 6 "7 Knowledge Graph", FIG. 7, etc. comprise a number of text items (concepts) connected by lines. These lines represent the degree of concepts, whereby the line thickness and/or an additional indicator (number) accompanying a respective line may indicate the degree.

A further example of application

The following is another example of the application of embodiments of the present invention. In this case data that relate to economics events is subject to a search; in particular the system collected automatically a number of articles from Financial Times™ and Wall Street Journal™ during a period of 6 months with the objective to trace the dynamics of the economic crisis. The mechanism can be similar to the one as described for the previous examples: a general dictionary specific in the domain of economics and European players was created; all articles have been automatically read; the concepts have been isolated from the semantic analysis and correlation across articles came together so as to generate a knowledge graph, (see FIG. 7). The result of the algorithms applied to the graph showed interesting considerations and highlighted the political nature of the European Economic crisis. The model above described was conceived to be able to hunt for non-evident leads and inferences in complex systems by analyzing multi-hop correlations in a network representing the complexity. Natural language processing has proved to be a very versatile and reliable instrument to map the essence of complex phenomena into network representation.

The second approach now explored is the possibilities of dealing with other type of subjects—such as economics and sociopolltics—so as to fully exploit the potential of the model. When dealing with disciplines other than Life Science, some constraints—used in the Natural Science deployment—may not hold anymore: 1.) The "path" approach may no longer be enough for the match. Therefore, the target of any given analysis can be a richer structure, i.e. a sub-graph, representing a picture of the particular phenomenon under investigation, to be obtained through connectivity and stochastic considerations. 2.) Since events happen over time, the key to identify changes in the scenarios may no more be the static topological structure of the network, but rather its dynamic evolution, 3.) The dictionary can be enhanced to update itself with new items arising from the news and must broaden its focus to capture expressions denoting also sentiment and consensus rather than limit itself on labelling entities.

It can be difficult to predict the evolution of real-world economic phenomena, because the effect of forces studied in mathematical economic models can be radically altered by the mutable nature of human relations and behavior. Apparently minor events and subtle consensus-shifts can induce major changes in the overall pattern of economic evolution: the so called "Butterfly effect" in chaos theory. If an economic system is pictured as a network of interacting players and entities, it is natural to rank the relevance of an event by the impact it has in reshaping, locally or globally, the topology of the network; looking for changes in the connectivity of players can thus be a way to early defect a change in the scenario. The following analysis is done by feeding the methodology used in the biomedical example with economic and political articles or feeds on economic/financial subjects, so as to exploit its network representation to study these dynamics and provide valuable leads.

Figure 8A:
FIGS. 8A, 8B, and 8C show an analysis of macroeconomic events.

An exemplary model has collected and analyzed a number of articles dealing with the European economic crisis in different time intervals (April 2012, June 2012, September 2012) and produced three distinct network representations. Through its associative inference engine the model assessed the changes in connectivity of the nodes of the graph and the changes in the overall graph structure, in order to verify that they are adequately representing the main current topics. An example on economics is identifying how the centrality of concepts in correlation with each other influences the dynamic of certain events. Any macro-economic dynamic can be inferred and tracked and therefore described even when involving geopolitical shifts:

European Context: April 2012 (FIG. 8A): —27 March: OECD calls for the Eurozone rescue fund to be increased to €1 trillion. —12-13 April: Italian and Spanish borrowing costs increase. —24 April: Toughest austerity plan since Franco era passed in Spain. —27 April: S&P downgrades Spain rating. —30 April: Eurostat declares eight Eurozone nations are in recession. —5 May: Francois Hollands is elected President in France Analysing FIG. 8A, the Read-out of the constructed graph appears as follows: Cluster of political concepts: —ECB is central: often cited and very well connected, mainly with political (red) nodes. —Germany is eccentric, less connected than Greece and France. Cluster of economic concepts: —Economic concepts (in green) are few and less connected than then political ones.

Europe and Eurozone are definitely hubs as they are the broad subjects selected from news. In the constellation of Hubs and satellite-concepts France sticks out due to its political campaign at this given time. To some extent this apply to Netherland too. Extra-european nations have a very marginal role, mainly as stakeholders in the sovereign debt market. The ECB is mainly cited in relation to its possible role in stimulating growth, in contrast with EU focus on fiscal discipline and austerity. Its president shares with France and Netherland concerns about the financial crisis. Italy and Spain already appear in connection with Greece and other debt-distressed nations, even if their involvement in the crisis is mild: contagion is feared. Germany, through its premier Angela Merkel is seen as supporter of fiscal discipline policies as opposed to bond buying programmes. From the above, it can be understood that the present disclosure is not concerned with the nature of information, possibly relating to economy, politics, etc. Rather, the present disclosure is concerned with searching information regardless of the field the information actually refers to.

Figure 8B:

European Context: June 2012 (FIG. 8B): —22 May: Germany declares opposition to Eurobonds. —12 June; Spain's borrowing costs rise dashing hopes for a bank bailout. —15 June: Angela Merkel states Germany's financial strength is not infinite. —15 June: former UK chancellor of the exchequer Gordon Brown warns that France and Italy may need a bail-out. —17 June: pro-austerity parties gain slim victory in Greece ejections. —29 June: Eurozone leaders agree to a deal allowing banks to receive direct aid from the ESM Analysing FIG. 8B, The Read-out of the constructed graph appears as follows: Cluster of political concepts: —ECB looses importance and links and is eccentric; it is now almost solely connected to Greece, IMF and European Commission. —Germany instead is very welt connected and gets a central position: if has stakes in many hot issues of the time. Cluster of economic concepts; —Economic news and concepts (green nodes) do not gain relevance. Greece is singled out and deals mostly with ECB and IMF for its bailout while the UK is strongly present as a debate is on about a Banking Union and they require special treatment for the City and its financial activities. Germany is seldom cited but involved in all the issues at stake. Italy and Spain are clustered together and openly discussed as needing a bailout: they do not participate in the debate about Bonds, banking union and the role of ECB in stimulus spending. Netherland is still in electoral campaign.

Summary of Events August-September 2012 (FIG. 8C): —7 August: President Draghi says ECB is ready to buy bonds from troubled banks again. —14 August: Eurozone GDP shrank 0.2% compared to first quarter. —3 September: fears of a bank run in Spain. —8 September; ECB President Draghi announces an unlimited bond-buying program to stabilize eurozone costs. —12 September: Barroso unveils plan for a European Central Bank.

Figure 8C:

Analysing FIG. 8C, The Read-out of the constructed graph appears as follows: Cluster of political concepts: —CB is back to central: and with increased prominence through its bond buying programme. —Germany has lost connections with economics and it appears just like other EU states.

Cluster of economic concepts: —Economic concepts are still few but of greater importance; they express the ECB intervention. ECB, its President and its newly proposed ESM (the Bond buying programme) are the core issue. Germany and other European governments are left overshadowed by the common European Institutions, even if Bundesbank opposition to the plan is discussed and a verdict from the German Court is expected. Only Spain is under the spotlight due to its dire banking situation, the apparent ineffectiveness of the austerity policy and its need to apply to the ESM. Private investors and financial institutions are commenting the impact of the new ECB instrument on their investments. Finally, UK disagrees the Banking Union and is not involved in the debate for the time being.

Analysis of the Networks and Conclusions

The representation of the networks in terms of nodes/edges ratios, density and average degree (graph theory algebraic statistics) is stable and robust; the networks show the expected scale-free structure that is the hallmark of complex systems. Overall stats and centrality measures confirm the robustness and structural stability of the network over time and thanks to the algorithms used in conjunction with the constructed graphs, it appears that the mathematical properties of the network are nearly constant in time i.e. in the three graphs. Community partitions identify the original source of information; the system digests the articles sentence by sentence, but a community-detecting algorithm finds clusters that correspond to the original feed: this is an indication that the dictionary and method of association is well fit to our data. The General conclusion is interesting: although one may consider obvious, the methodology adopted found that the source of the economic crisis is driven by political power struggle.

In fact, in all three networks the purely economic factors are peripheral while political ones are constantly central. The nations (and therefore Governments) are the major actors in the three network representations. The ECB is almost always connected with nations and other "political" nodes: from the network perspective ECB looks like a state itself rather than a player in the Economic arena. The interpretation is that the European Crisis is influenced more from political play rather than the general "economic" factors.

Another embodiment of the present invention can be defined as a machine-implemented method, or corresponding processing entity, of relating multiple information nodes in an information network, and reveal emergent patterns, known as inferences, comprising the steps of: processing a plurality of data objects according to a semantic pre-process engine which produces atomic units of information and by means of a predefined dictionary containing a plurality of references, detects in the plurality of data objects, the presence of a correlation between respective information units; constructing an information network with a plurality of information nodes and weighted links between the information nodes, said information nodes being related to said information unite and said links being related to said detected correlations; analyzing the link connectivity state of said information network to find paths across multiple information.

Another embodiment of the present invention can be defined as a machine-implemented method, or corresponding processing entity, of relating multiple information nodes in an information network, comprising the steps of: processing a plurality of data objects expressed in natural language according to a predefined dictionary containing a plurality of information unite and a plurality of correlation-indicating elements to defect in the plurality of data objects the presence of a correlation between respective information units; establishing an information network with a plurality of information nodes and links between the information nodes, said information nodes being related to said information units and said links being related to said detected correlations; analyzing a link connectivity state of said information network to find a path across multiple information nodes that represents an inference or a set of inferences being input by a query searched by a user.

The above examples have been described to provide a better understanding of the application of the invention in one of the fields where the invention can be industrially applied. The invention can be applied, without limitation, in a range of other fields as for example, econophysics, study of financial and economic trends, social behaviour, natural processes, the Internet, economics, sociophysics, finance, medicine, pharmaceutics, biology, biochemistry, biophysics, physics, chemistry, engineering and so on.

Further, although detailed embodiments have been described, these only serve to provide a better understanding of the invention defined by the independent claims, and are not to be seen as limiting.

The invention claimed is:
1. A computer-implemented method for performing a search engine query across one or more electronic databases in response to user input, the search engine query utilizing a knowledge graph constructed by extracting and relating multiple information nodes, the computer-implemented method comprising:
  receiving, from a user interface, a search query;
  accessing, from one or more electronic databases, a knowledge graph;
  generating, by an electronic processor, search engine query results based on the accessed knowledge graph, wherein the knowledge graph is constructed by:
    accessing, from the one or more electronic databases through an electronic communication network, a plurality of data objects, wherein the plurality of data objects are from a plurality of homogenous fields;
    accessing, from the one or more electronic databases, a plurality of pre-programmed information units, wherein said plurality of pre-programmed information units are configurable through a dictionary taxonomy to define a semantic field of research;
    processing, by the electronic processor, said plurality of data objects with syntactic and semantic analysis, based at least in part on said pre-programmed information units, to create a plurality of information units and a plurality of correlation-indicating elements, wherein said plurality of correlation-indicating elements contains at least values relating to strengths of the correlations between the plurality of information units;
    generating, by the electronic processor, a knowledge base based at least in part on the information units and the plurality of correlation-indicating elements, wherein said generating is performed with a computational linguistics algorithm, wherein said generating is performed automatically, wherein said generating is further performed without a predefined, manually curated ontology;
    representing said knowledge base graphically in a knowledge graph based at least in part on the plurality of information units and the plurality of correlation-indicating elements, wherein the knowledge graph depicts a plurality of information nodes and a plurality of links between the plurality of information nodes, said plurality of information nodes comprising said information units and said plurality of links based at least in part on the plurality of correlation-indicating elements;

analyzing, by the electronic processor, the plurality of information nodes in the knowledge graph with a stochastic algorithm, wherein said plurality of information nodes are linked to one another either directly or indirectly through one or more links, the stochastic algorithm comprising:
  generating a non-symmetric vector comprising a plurality of probabilities, each probability proportional to a dependency between each pair of information nodes in the plurality of information nodes; and
  symmetrizing said non-symmetric vector by taking an average number of steps of two directions between each pair of information nodes in the plurality of information nodes;
determining ranking measures between the plurality of information nodes, wherein each ranking measure represents a measure of similarity between each pair of information nodes and indicates indirect relations among the information units corresponding to each pair of information nodes, wherein said ranking measure is further based on the probability of selecting the average number of steps between each pair of information nodes as determined by the stochastic algorithm; and
modifying lengths of the links in the knowledge graph based on the determined ranking measure,
wherein the generated search engine query results comprise one or more correlations between two or more information nodes, wherein the one or more correlations are ordered based on the modified lengths of the links in the knowledge graph; and
providing the ordered search engine query results to the user.

2. The computer-implemented method of claim 1, wherein the unstructured knowledge base is generated by an unsupervised approach.

3. The computer-implemented method of claim 1, further comprising collecting said plurality of data objects from distributed input sources.

4. The computer-implemented method of claim 1, wherein said stochastic algorithm is a customized random walk mathematical model.

5. The computer-implemented method of claim 4, wherein said customized random walk mathematical model uses a shortest path or a constraint shortest path technique.

6. The computer-implemented method of claim 1, wherein said information nodes are objects retrieved by a query searched by a user.

7. The computer-implemented method of claim 1, wherein said plurality of pre-programmed information units are defined by a user.

8. The computer-implemented method of claim 1, wherein said information units and/or said information nodes define an object term related to: an industrial, a financial, a business, a social, a political, an economic, a scientific, a research, an analysis, a medical, a biochemical, a biomolecular, a chemical, a technical, or a pharmaceutical term.

9. The computer-implemented method of claim 8, wherein said object term defines an object, a node, or a concept that is related to one or more areas of applications that are deemed to be: constituent objects, a drug, an active ingredient, an active agent, a medical compound, a chemical compound, a pharmaceutical compound, a therapy, a cure, a cause, an effect, a disease, a symptom, a disease symptom, a diet, a nutrition, a lifestyle feature, a habit, a pathogenesis, a disease cause, a disease pathogenesis, an item associated with a disease, an item associated with a pathogenesis of a disease, an economic measure, a statistical similarity, a call detail record (CDR), the status of a subscriber or a line, interactions between or across multiple lines, statistical correlations or any concepts identifying statistical behavior, a sentiment, or its dynamics for a social application.

10. A non-transitory, computer-readable storage medium having an executable program stored thereon, wherein the program instructs a computer to perform a search engine query across one or more electronic databases in response to user input, the search engine queary utilizing a knowledge graph constructed by extracting and relating multiple information nodes, by performing the following:
  receiving, from a user interface, a search query;
  accessing, from one or more electronic databases, a knowledge graph;
  generating, by an electronic processor, search engine query results based on the accessed knowledge graph, wherein the knowledge graph is constructed by:
    accessing, from one or more electronic databases through an electronic communication network, a plurality of data objects, wherein the plurality of data objects are from a plurality of non-homogeneous fields;
    accessing, from the one or more electronic databases, a plurality of pre-programmed information units, wherein said plurality of pre-programmed information units are configurable through a dictionary taxonomy to define a semantic field of research;
    processing, by the electronic processor, said plurality of data objects with syntactic and semantic analysis, based at least in part on said pre-programmed information units, to create a plurality of information units and a plurality of correlation-indicating elements, wherein said plurality of correlation-indicating elements contains at least values relating to strengths of the correlations between the plurality of information units;
    generating, by the electronic processor, a knowledge base based at least in part on the information units and the plurality of correlation-indicating elements, wherein said generating is performed with a computational linguistics algorithm, wherein said generating is performed automatically, wherein said generating is further performed without a predefined, manually curated ontology;
    representing the knowledge base graphically in a knowledge graph based at least in part on the plurality of information units and the plurality of correlation-indicating elements, wherein the knowledge graph depicts a plurality of information nodes and a plurality of links between the plurality of information nodes, said plurality of information nodes comprising said information units and said plurality of links based at least in part on the plurality of correlation-indicating elements;
    analyzing, by the electronic processor, the plurality of information nodes in the knowledge graph with a stochastic algorithm, wherein said plurality of information nodes are linked to one another either directly or indirectly through one or more links, the stochastic algorithm comprising:
      generating a non-symmetric vector comprising a plurality of probabilities, each probability proportional to a dependency between each pair of
information nodes in the plurality of information
nodes; and
symmetrizing said non-symmetric vector by taking
an average number of steps of two directions
between each pair of information nodes in the
plurality of information nodes;
determining ranking measures between the plurality of
information nodes, wherein each ranking measure
represents a measure of similarity between each pair
of information nodes and indicates indirect relations
among the information units corresponding to each
pair of information nodes, wherein said ranking
measure is further based on the probability of selecting the average number of steps between each pair of
information nodes as determined by the stochastic
algorithm; and
modifying lengths of the links in the knowledge graph
based on the determined ranking measure,
wherein the generated search engine query results
comprise one or more correlations between two or
more information nodes, wherein the one or more
correlations are ordered based on the modified
lengths of the links in the knowledge graph; and
providing the ordered search engine query results to the
user.

11. The non-transitory, computer-readable storage medium of claim 10, wherein the program is configured to collect the plurality of data objects from distributed input sources.

12. The non-transitory, computer-readable storage medium of claim 10, wherein said stochastic algorithm is a customized random walk mathematical model.

13. The non-transitory, computer-readable storage medium of claim 12, wherein said customized random walk mathematical model uses a shortest path or a constraint shortest path technique.

14. The non-transitory, computer-readable storage medium of claim 10, wherein said plurality of pre-programmed information units are defined by a user.

15. The non-transitory, computer-readable storage medium of claim 10, wherein the information nodes are objects retrieved by a query searched by a user.

16. A computer system for performing a search engine query across one or more electronic databases in response to user input, the search engine query utilizing a knowledge graph constructed by extracting and relating multiple information nodes, the system comprising:
a computation device configured for receiving data input;
a non-transitory computer-readable storage medium having an executable program stored thereon, wherein the program instructs a computer to perform the operations comprising:
receiving, from a user interface, a search query;
accessing, from one or more electronic databases, a knowledge graph;
generating, by an electronic processor, search engine query results based on the accessed knowledge graph, wherein the knowledge graph is constructed by:
accessing, from one or more electronic databases through an electronic communication network, a plurality of data objects, wherein the plurality of data objects are from a plurality of non-homogeneous fields;
accessing, from the one or more electronic databases, a plurality of pre-programmed information units, wherein said plurality of pre-programmed information units are configurable through a dictionary taxonomy to define a semantic field of research;
processing, by the electronic processor, said plurality of data objects with syntactic and semantic analysis, based at least in part on said pre-programmed information units, to create a plurality of information units and a plurality of correlation-indicating elements, wherein said plurality of correlation-indicating elements contains at least values relating to strengths of the correlations between the plurality of information units;
generating, by the electronic processor, a knowledge base based at least in part on the information units and the plurality of correlation-indicating elements, wherein said generating is performed with a computational linguistics algorithm, wherein said generating is performed automatically, wherein said generating is further performed without a predefined, manually curated ontology;
representing said processed knowledge base graphically in a knowledge graph based at least in part on the plurality of information units and the plurality of correlation-indicating elements, wherein the knowledge graph depicts a plurality of information nodes and a plurality of links between the plurality of information nodes, said plurality of information nodes comprising said information units and said plurality of links based at least in part on the plurality of correlation-indicating elements;
analyzing, by the electronic processor, the plurality of information nodes in the knowledge graph with a stochastic algorithm, wherein said plurality of information nodes are linked to one another either directly or indirectly through one or more links, the stochastic algorithm comprising:
generating a non-symmetric vector comprising a plurality of probabilities, each probability proportional to a dependency between each pair of information nodes in the plurality of information nodes; and
symmetrizing said non-symmetric vector by taking an average number of steps of two directions between each pair of information nodes in the plurality of information nodes;
determining ranking measures between the plurality of information nodes, wherein each ranking measure represents a measure of similarity between each pair of information nodes and indicates indirect relations among the information units corresponding to each pair of information nodes, wherein said ranking measure is further based on the probability of selecting the average number of steps between each pair of information nodes as determined by the stochastic algorithm; and
modifying lengths of the links in the knowledge graph to reflect the determined ranking measure,
wherein the generated search engine query results comprise one or more correlations between two or more information nodes, wherein the one or more correlations are ordered based on the modified lengths of the links in the knowledge graph; and
providing the ordered search engine query results to the user.

17. The computer system of claim 16, wherein the unstructured knowledge base is generated by an unsupervised approach.

18. The computer system of claim 16, wherein said stochastic algorithm is a customized random walk mathematical model.

19. The computer system of claim 16, wherein said information nodes are objects retrieved by a query searched by a user.

* * * * *